US012601990B2

(12) United States Patent
Peng et al.

(10) Patent No.: US 12,601,990 B2
(45) **Date of Patent: *Apr. 14, 2026**

(54) DEVELOPING CARTRIDGE

(71) Applicant: JIANGXI YIBO E-TECH CO. LTD., Xinyu (CN)

(72) Inventors: Jian Peng, Xinyu (CN); Liangliang Hu, Xinyu (CN); Rongli Xu, Xinyu (CN)

(73) Assignee: JIANGXI YIBO E-TECH CO. LTD., Xinyu (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/968,837

(22) Filed: Dec. 4, 2024

(65) Prior Publication Data

US 2025/0093796 A1 Mar. 20, 2025

Related U.S. Application Data

(63) Continuation of application No. 18/892,182, filed on Sep. 20, 2024, now Pat. No. 12,197,145, which is a (Continued)

(30) Foreign Application Priority Data

Apr. 27, 2023 (CN) ......................... 202320997361.2
Sep. 8, 2023 (CN) ......................... 202322444876.2
Apr. 27, 2024 (CN) ......................... 202410518618.0

(51) Int. Cl.
*G03G 15/04* (2006.01)
*G03G 15/08* (2006.01)
*G03G 21/16* (2006.01)

(52) U.S. Cl.
CPC ..... *G03G 15/0872* (2013.01); *G03G 15/0808* (2013.01); *G03G 15/0812* (2013.01); *G03G 21/1647* (2013.01); *G03G 21/1652* (2013.01)

(58) Field of Classification Search
CPC ........... G03G 15/0808; G03G 15/0812; G03G 15/0872; G03G 21/1652; G03G 21/1667
(Continued)

(56) References Cited

U.S. PATENT DOCUMENTS 5,489,974 A 2/1996 Kamaji et al.
6,314,263 B1 11/2001 Yoshida et al.
(Continued)

FOREIGN PATENT DOCUMENTS

CN 101614987 B * 4/2013
CN 204347446 U 5/2015
(Continued)

*Primary Examiner* — Hoan H Tran
(74) *Attorney, Agent, or Firm* — IPro, PLLC

(57) ABSTRACT

A developing cartridge includes: a developing roller rotatable about a rotational axis extending in a first direction; a casing configured to accommodate developer therein; an input gear rotatable about a first axis extending in the first direction, the input gear being positioned at one side of the casing in the first direction; an electrode with an electrical contact surface. The developing roller has a developing roller shaft extending in the first direction, a covering layer covering a surface of the developing roller shaft, and an elastic layer rotating synchronously with the developing roller shaft; and the electrical contact surface is electrically connected to a component of the developing cartridge, and the covering layer is made of a non-metallic material or an electrically insulating material.

20 Claims, 24 Drawing Sheets

Related U.S. Application Data continuation-in-part of application No. PCT/CN2024/090241, filed on Apr. 27, 2024.

(58) Field of Classification Search
USPC .................................. 399/107, 110, 111, 119
See application file for complete search history.

(56) References Cited

U.S. PATENT DOCUMENTS

| | | | | |
|---|---|---|---|---|
| 8,693,914 | B2 | 4/2014 | Sato | |
| 9,964,922 | B2 * | 5/2018 | Shimizu ............. | G03G 21/1896 |
| 10,649,366 | B2 | 5/2020 | Fukaya et al. | |
| 11,675,289 | B2 * | 6/2023 | Itabashi ............. | G03G 15/0867<br>399/119 |
| 12,197,145 | B1 * | 1/2025 | Peng .................. | G03G 15/0808 |

FOREIGN PATENT DOCUMENTS

| | | | |
|---|---|---|---|
| CN | 206249009 | U | 6/2017 |
| CN | 104460270 | B | 5/2021 |
| CN | 216561405 | U | 5/2022 |
| JP | 2000242088 | A | 9/2000 |

* cited by examiner

DEVELOPING CARTRIDGE

TECHNICAL FIELD

The present application relates to the technical field of electronic photographic imaging, and in particular to a developing cartridge.

BACKGROUND

The prior art discloses a developing cartridge. It is necessary to supply power to a developing roller and a supply roller when the developing cartridge performs developing work. The developing cartridge can be attached to a drum cartridge so as to be mounted in the body of an imaging apparatus, and in a state where the developing cartridge is attached to the drum cartridge, a contact surface of an electrode can be arranged on the outside of a lateral wall of the drum cartridge, thereby transmitting power to a developing roller shaft and a supply roller shaft.

However, the above power transmission scheme requires the electrode to contact both the developing roller shaft and the supply roller shaft, and the structure is relatively complicated. Moreover, this increases the conductive material required for the electrode, but the manufacturing cost of the conductive material is higher than that of the non-conductive material, thereby increasing the manufacturing cost of the developing cartridge.

SUMMARY

A developing cartridge is described herein that can reduce the difficulty of electrode design and reduce the manufacturing cost of the developing cartridge.

In an embodiment, the developing cartridge comprises: a developing roller rotatable about a rotational axis extending in a first direction; a casing configured to accommodate developer therein; an input gear rotatable about a first axis extending in the first direction, the input gear being positioned at one side of the casing in the first direction; a layer thickness regulating member configured to regulate a thickness of a developer layer carried on a surface of the developing roller; and an electrode with an electrical contact surface. The developing roller comprises a developing roller shaft extending in the first direction, a covering layer covering a surface of the developing roller shaft, and an elastic layer rotating synchronously with the developing roller shaft. The electrical contact surface is electrically connected to the layer thickness regulating member, and the covering layer is made of a non-metallic material or an electrically insulating material.

The electrical contact surface may be positioned at another side of the casing in the first direction.

The layer thickness regulating member may abut an outer surface of the elastic layer.

An electrical resistance between the electrical contact surface and the developing roller shaft may be greater than an electrical resistance between the electrical contact surface and the elastic layer.

At least a part of the covering layer may be between the elastic layer and the developing roller shaft.

The developing cartridge may further comprise a supply roller, and the supply roller is rotatable about a second axis extending in the first direction, and the electrical contact surface is electrically connected to the supply roller.

The developing cartridge may further comprise a bracket positioned at another side of the casing in the first direction. The electrode is supported on the bracket, one end of the developing roller shaft is supported on the bracket, and the bracket is made of an insulating material.

The covering layer may electrically insulate the developing roller shaft.

The developing cartridge may further comprise a bracket positioned at another side of the casing in the first direction, the bracket comprises a developing roller bearing thereon, and the covering layer is supported by the developing roller bearing.

The developing cartridge may further comprise a storage unit, at the one side of the casing, and the storage unit and the covering layer are separated in a second direction different from the first direction.

A through hole may be provided at an end of the developing roller shaft.

The developing cartridge may further comprise an urging protrusion and a storage unit, the storage unit is at the one side of the casing, and the urging protrusion is positioned between the covering layer and the storage unit in a second direction intersecting the first direction.

The developing cartridge may further comprise a storage unit at the one side of the casing, the electrical contact surface is positioned between the covering layer and the storage unit in a second direction different from the first direction.

The developing cartridge may further comprise an electrical connector at the one side of the casing in the first direction, the electrical connector is electrically connected to the layer thickness regulating member, and the electrical connector is movable between a first position at which the electrical connector is electrically connected to a grounded metal frame outside the developing cartridge, and a second position at which the electrical connector is electrically disconnected from the grounded metal frame.

The developing cartridge may further comprise a protrusion that is movable according to rotation of the input gear, and the electrical connector moves between the first position and the second position according to movement of the protrusion.

In an embodiment, the developing cartridge comprises a developing roller rotatable about a rotational axis extending in a first direction; a casing configured to accommodate developer therein; an input gear rotatable about a first axis extending in the first direction, the input gear being positioned at one side of the casing in the first direction; a layer thickness regulating member configured to regulate a thickness of a developer layer carried on a surface of the developing roller; and an electrode with an electrical contact surface, and the electrical contact surface being positioned at another side of the casing in the first direction. The layer thickness regulating member abuts an outer surface of the developing roller, the electrical contact surface is electrically connected to the layer thickness regulating member, the developing roller comprises a developing roller shaft extending in the first direction and an elastic layer rotating synchronously with the developing roller shaft, and an electrical resistance between the electrical contact surface and the developing roller shaft is greater than or equal to 1 MΩ.

The electrical resistance may be greater than or equal to 20 MΩ.

The developing roller may further comprise a covering layer that electrically insulates the developing roller shaft.

The developing roller may further comprise a covering layer covering a surface of the developing roller shaft, and the electrical resistance is greater than an electrical resistance between the electrical contact surface and the elastic layer.

The developing cartridge may further comprise a bracket at another side of the casing, the bracket comprises a developing roller bearing thereon, a surface of the developing roller shaft is covered with a covering layer, the covering layer is made of an electrically insulating material, and the covering layer is supported by the developing roller bearing.

The developing cartridge may further comprise a supply roller, the supply roller comprises a supply roller shaft, the supply roller shaft is rotatable about a second axis extending in the first direction, and an electrical resistance between the electrical contact surface and the supply roller shaft is greater than 10 MΩ.

A through hole may be provided at an end of the developing roller shaft in the first direction.

A new conductive member transmits power to the developing cartridge by connecting with the layer thickness regulating member or the supply roller shaft, thereby reducing the design difficulty of the conductive member and the manufacturing cost of the developing cartridge.

DETAILED DESCRIPTION

In the following description, a direction in which an axis of rotation of a developing roller extends is referred to as a first direction (also referred to as an axial direction). A second direction is the front-to-rear extension direction of a developing cartridge, and the developing roller is located in front in the second direction. The first direction and the second direction intersect each other. A third direction is a direction perpendicular to the first direction and the second direction.

Embodiment 1

Figure 1:
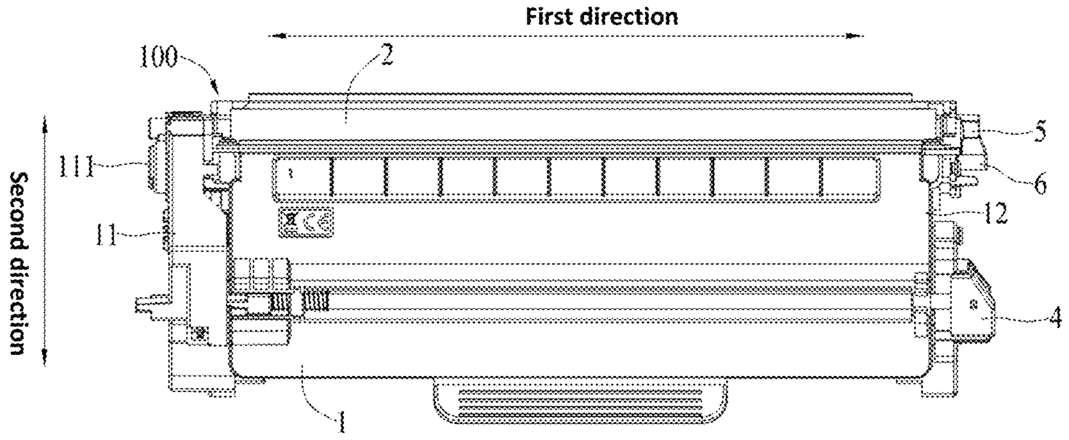
FIG. 1 is a schematic structural view of a developing cartridge according to Embodiment 1 of the present application from one angle.
Figure 2:
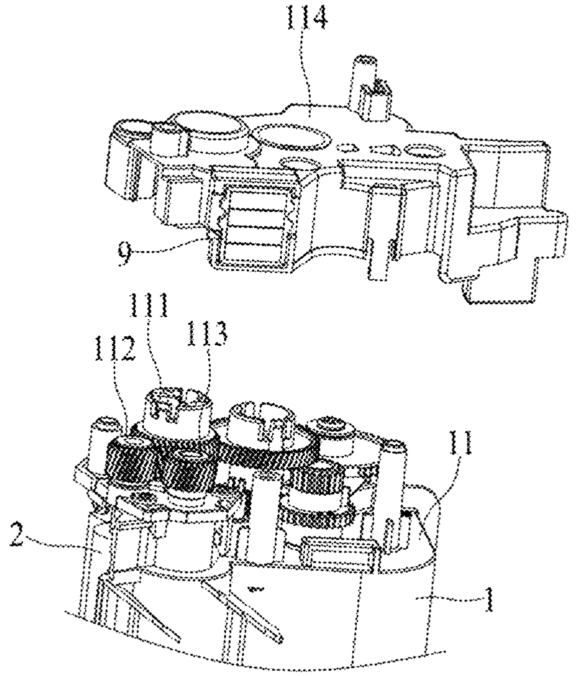
FIG. 2 is a partial exploded schematic view of a first side of the developing cartridge according to Embodiment 1 of the present application.

As shown in FIGS. 1 and 2, Embodiment 1 of the present application discloses a developing cartridge 100. The developing cartridge 100 is detachably mounted in an image forming device, and includes a casing 1 that can be filled with developer. The casing 1 includes a first side 11 and a second side 12 that are separated from each other in the first direction. The developing roller 2 is rotatably supported between the first side 11 and the second side 12 of the casing 1, and can rotate about a first rotation axis extending in the first direction. The supply roller 3 is rotatably supported between the first side 11 and the second side 12 of the casing 1, and can rotate about a second rotation axis extending in the first direction. As shown in FIG. 2, the developing cartridge 100 further includes an input gear 111, a developing roller gear 112, and a supply roller gear 113 positioned at the first side, and the input gear can be meshed with a driving force input member (not shown) in the image forming device to receive a driving force from the image forming device and rotate. The input gear 111 is separately meshed with the developing roller gear 112 and the supply roller gear 113 to transmit the received driving force to the developing roller 2 and the supply roller 3 separately, thereby driving the developing roller 2 and the supply roller 3 to rotate. The first side 11 is further provided with a protective cover 114 and a storage unit 9. The protective cover 114 covers at least a part of the input gear 111, the developing roller gear 112 and the supply roller gear 113. In this embodiment, the storage unit 9 is mounted on the protective cover 114, and the storage unit 9 is used to store relevant information of the developing cartridge 100, and has an electrical contact portion exposed outside the protective cover 114.

Figure 6:
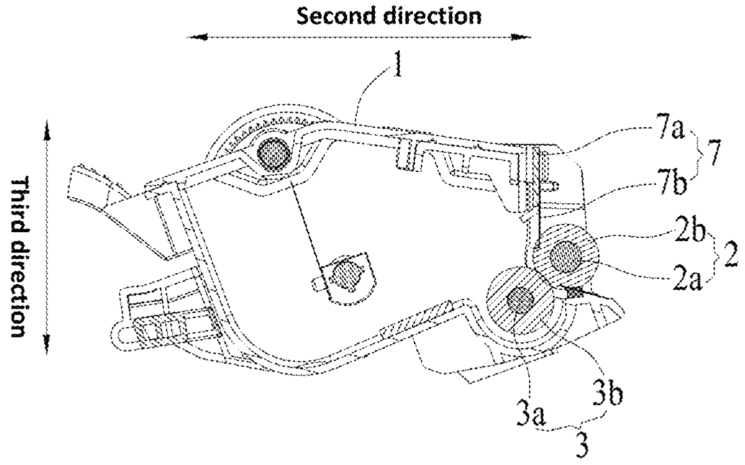
FIG. 6 is a cross-sectional view of the developing cartridge according to Embodiment 1 of the present application from one angle.

As shown in FIG. 6, the developing roller 2 includes a developing roller shaft 2*a* and a developing roller body (elastic layer) 2*b*. The developing roller body 2*b* is made of elastic rubber, the developing roller shaft 2*a* is a cylindrical member extending along the first direction, and the developing roller shaft 2*a* is disposed through the developing roller body 2*b*. The developing roller body 2*b* is fixed on the developing roller shaft 2*a*, so that the developing roller body 2*b* can rotate synchronously with the developing roller shaft 2*a*. The developing roller shaft 2*a* is made of metal or conductive resin, or the developing roller shaft 2*a* is made of an insulating material. Alternatively, the developing roller shaft 2*a* and the developing roller body 2*b* are isolated by an insulating material, so that an insulating structure is formed between the developing roller shaft 2*a* and the developing roller body 2*b*. For example, an insulating material is electroplated, electrophoresed or sprayed on an outer surface of the developing roller shaft 2*a* to form insulation between the developing roller shaft 2*a* and the developing roller body 2*b*, wherein the material of the insulating layer (interchangeably referred to as "covering layer") is specifically formed of a non-metallic material. A positioning through hole is provided at one end of the developing roller shaft 2*a*, and the positioning through hole is used to position the developing roller shaft 2*a* when the developing roller shaft 2*a* is subjected to electroplating, electrophoresis or spraying operation. The supply roller 3 includes a supply roller shaft 3*a* and a supply roller body 3*b*. The supply roller body 3*b* is made of sponge. The supply roller shaft 3*a* is a cylindrical member extending along the first direction, and the supply roller shaft 3*a* is disposed through the supply roller body 3*b*. The supply roller body 3*b* is fixed on the supply roller shaft 3*a*, so that the supply roller body 3*b* can rotate synchronously with the supply roller shaft 3*a*. Further, the supply roller shaft 3*a* is insulated from a conductive member 6. Specifically, the supply roller shaft 3*a* is made of an insulating material. Alternatively, the supply roller shaft 3*a* is made of metal or conductive resin, and the supply roller shaft 3*a* and the supply roller body 3*b* are isolated by an insulating material, so that an insulating structure is formed between the supply roller shaft 3*a* and the supply roller body 3*b*. For example, an insulating layer is electroplated, electrophoresed or sprayed on an outer surface of the supply roller shaft 3*a* to form insulation between the supply roller shaft 3*a* and the supply roller body 3*b*, wherein the material of the insulating layer is specifically formed of a non-metallic material. A second positioning through hole is provided at one end of the supply roller shaft 3*a*, and the second positioning through hole is used to position the supply roller shaft 3*a* when the supply roller shaft 3*a* is subjected to electroplating, electrophoresis or spraying operation.

Figure 3:
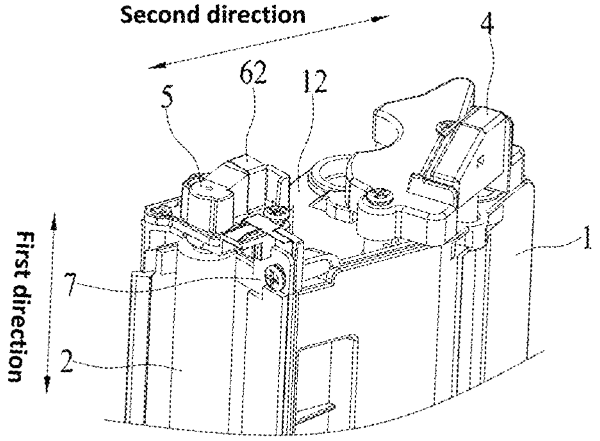
FIG. 3 is a schematic view of a three-dimensional structure of a second side of the developing cartridge according to Embodiment 1 of the present application.
Figure 4:
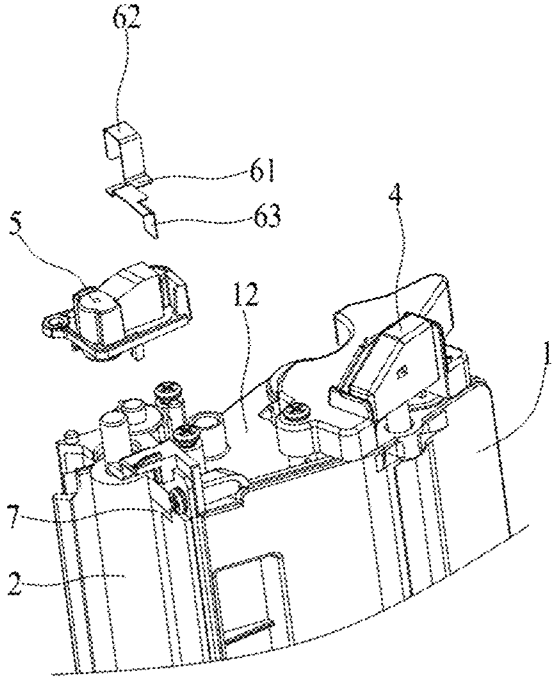
FIG. 4 is a partial exploded schematic view of the second side of the developing cartridge according to Embodiment 1 of the present application.
Figure 5:
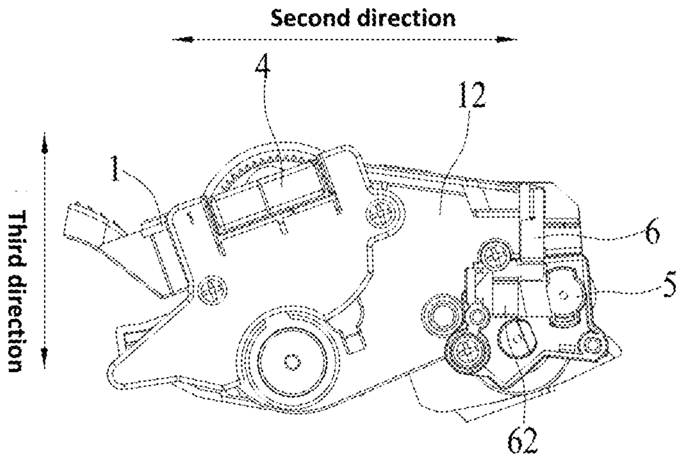
FIG. 5 is a schematic view of a front structure of the second side of the developing cartridge according to Embodiment 1 of the present application.

As shown in FIGS. 3-5, the developing cartridge 100 is further provided with a detection protrusion 4 on the second side 12 in the first direction. The detection protrusion 4 is used to be detected by a detection unit provided in the image forming device when the developing cartridge 100 is mounted in the image forming device, so as to verify whether the developing cartridge 100 is a new developing cartridge 100, and the service life of the developing cartridge 100, i.e., the number of printable pages of the developing cartridge 100, is further identified by means of the detection unit detecting the detection protrusion 4. A bracket 5 and the conductive member 6 are provided on the same side of the developing cartridge 100 as the detection protrusion 4. The conductive member 6 is spaced apart from the detection protrusion 4 in the second direction, and the detection protrusion 4 is located behind the conductive member 6 in the second direction. In this embodiment, the detection protrusion 4 is positioned at the opposite side of the input gear 111 relative to the casing 1. Of course, optionally, the detection protrusion 4 may also be positioned at the same side of the input gear 111. As shown in FIG. 5, the bracket 5 is constructed of insulating plastic, and the bracket 5 includes a developing roller bearing and a supply roller bearing. The developing roller 2 protrudes from a surface of the casing 1 on the second side 12 of the casing 1 to form a first end. The insulating layer is supported by the developing roller bearing. The first end is rotatably borne on the developing roller bearing. The supply roller 3 protrudes from the surface of the casing 1 on the second side 12 of the casing 1 to form a second end. The second end is rotatably borne on the supply roller bearing.

Figure 7:
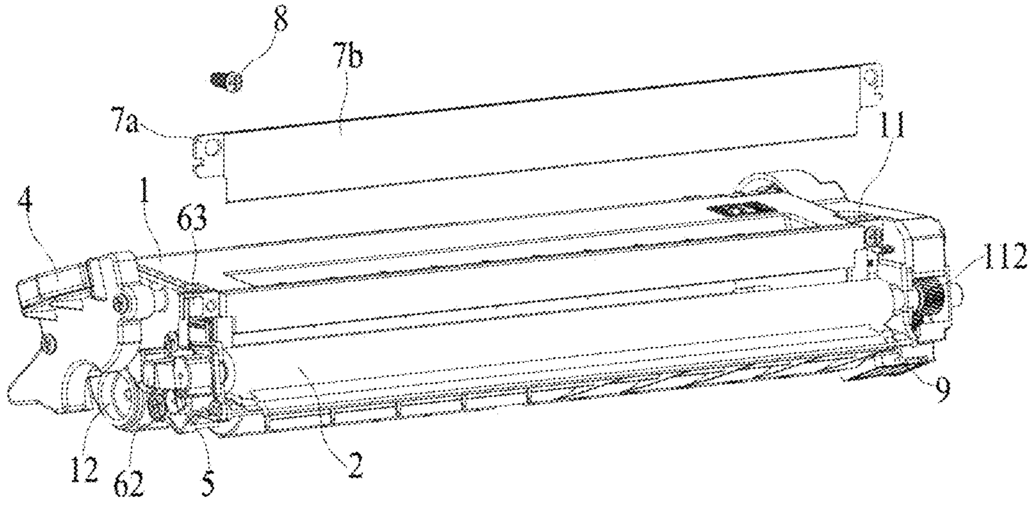
FIG. 7 is a partial exploded schematic view of the developing cartridge according to Embodiment 1 of the present application from another angle.

As shown in FIGS. 3 and 7, the developing cartridge 100 further includes a layer thickness regulating member 7. The layer thickness regulating member 7 is positioned at a front end of the developing cartridge 100 in the second direction and adjacent to the developing roller 2. Specifically, the layer thickness regulating member 7 is positioned behind the developing roller 2 in the second direction, and the layer thickness regulating member 7 extends between the first side 11 and the second side 12 of the casing 1 in the first direction, and is used to adjust the thickness of developer attached to the developing roller 2, thereby improving the printing quality. The layer thickness regulating member 7 includes a blade holder 7*a* and a blade 7*b*, both of which extend in the first direction. The blade holder 7*a* is fixed to the casing 1 by a screw 8. One end of the blade 7*b* is fixed to the blade holder 7*a*, and the other end of the blade 7*b* abuts the developing roller 2. Specifically, the other end of the blade 7*b* abuts the outer surface of the developing roller body 2*b*, and after the developer is attached to the developing roller body 2*b*, the thickness of the developer attached to the surface of the developing roller body 2*b* is adjusted.

Figure 8:
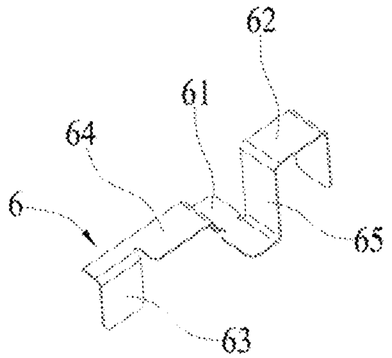
FIG. 8 is a schematic view of a three-dimensional structure of a conductive member of the developing cartridge according to Embodiment 1 of the present application.
Figure 9:
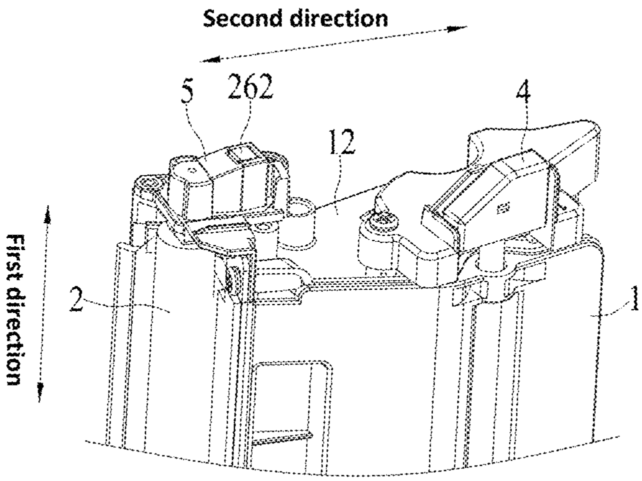
FIG. 9 is a schematic view of a three-dimensional structure of a second side of the developing cartridge according to Embodiment 2 of the present application.

As shown in FIGS. 5 and 8, the conductive member 6 is positioned at the second side 12, and the conductive member 6 is at least partially supported on the bracket 5. The conductive member 6 and the developing roller shaft 2*a* are separated by the bracket 5, and the conductive member 6 and the supply roller shaft 3*b* are separated by the bracket 5, so as to realize the insulation setting between the conductive member 6 and the developing roller shaft 2*a* and the supply roller shaft 3*a*. The conductive member 6 transmits power to the developing cartridge 100 only through the layer thickness regulating member 7, which simplifies the structure of the conductive member 6. The conductive member 6 includes a main body portion 61, a first contact portion 62 and a second contact portion 63. The main body portion 61 extends in the second direction and has a first end 65 and a second end 64 that are separated from each other in the second direction. The main body portion 61 may be fixed to the second side 12 by a screw, wherein the first contact portion 62 extends from the first end 65 to form a plate-like structure. The first contact portion 62 has a contact side surface (electrical contact surface) facing the left side. The contact side surface may contact a power supply component of the image forming device to achieve electrical connection and receive power output by the power supply component. The first contact portion 62 is supported on the bracket 5. The second contact portion 63 is extended from the second end 64 of the main body portion 61. The second contact portion 63 is used to be electrically connected to the layer thickness regulating member 7 to transmit power received by the conductive member 6 to the layer thickness regulating member 7. Specifically, the second contact portion 63 contacts the blade holder 7*a* of the layer thickness regulating member 7 to form an electrical connection. The second contact portion 63 extends in the first direction, and the second contact portion 63 is positioned between the layer thickness regulating member 7 and the casing 1 in the first direction. Moreover, the second contact portion 63 is positioned at a fixed position close to a left side of the layer thickness regulating member 7, so that when the screw 8 fixes the layer thickness regulating member 7, the second contact portion 63 can be pressed and fixed at the same time, that is, the second contact portion 63 is also fixed by the screw 8.

The second contact portion 63 is closer to the casing 1 relative to the first contact portion 62 in the first direction. The first contact portion 62 is located on a left side of the second contact portion 63 in the first direction, the second contact portion 63 is located between the first contact portion 62 and the layer thickness regulating member 7 in the first direction, and the second contact portion 63 is closer to the layer thickness regulating member 7 relative to the first contact portion 62. In the second direction, the developing roller 2, the second contact portion 63 and the first contact portion 62 are arranged in sequence from front to rear, that is, the second contact portion 63 is located between the developing roller 2 and the first contact portion 62 in the second direction, and the second contact portion 63 is located between the layer thickness regulating member 7 and the first contact portion 62 in the second direction.

In the first direction, the electrical contact portion is separated from the developing roller body 2*b*, and the electrical contact portion is separated from the supply roller body 3*b*. In the first direction, the electrical contact portion is separated from the supply roller shaft 3*a*, and the electrical contact portion is separated from the layer thickness regulating member 7. The electrical contact portion of the storage unit 9 is separated from the supply roller shaft 3*a* and the conductive layer thickness regulating member 7, so that the interference of the supply roller shaft 3*a* and the layer thickness regulating member 7 on the signal transmission of the electrical contact portion of the storage unit 9 when powered on is reduced, and the functional stability of the storage unit 9 is improved. Similarly, in the second direction intersecting the first direction, the electrical contact portion of the storage unit 9 is separated from the developing roller shaft 2*a*, the electrical contact portion of the storage unit 9 is separated from the supply roller shaft 3*a*, and the electrical contact portion of the storage unit 9 is separated from the layer thickness regulating member 7, so that the interference of the developing roller shaft 2*a*, the supply roller shaft 3*a* and the layer thickness regulating member 7 on the signal transmission of the electrical contact portion of the storage unit 9 when powered on is reduced, and the functional stability of the storage unit 9 is improved.

In this embodiment, the developing roller shaft 2*a* is insulated from the conductive member 6, or the developing roller shaft 2*a* does not receive external power through the conductive member 6, and only transmits power to the layer thickness regulating member 7 through the conductive member 6. An electrical resistance between the first contact portion 62 and the developing roller shaft 2*a* is greater than an electrical resistance between the first contact portion 62 and the layer thickness regulating member 7, that is, the power on the developing roller body 2*b* needs to be transmitted through the layer thickness regulating member 7 and the conductive member 6. The electrical resistance between the developing roller shaft 2*a* and the layer thickness regulating member 7 is greater than 1 MΩ (megaohm). Preferably, the electrical resistance between the developing roller shaft 2*a* and the layer thickness regulating member 7 is greater than 20 MΩ (megaohm). That is, the electrical resistance between the developing roller shaft 2*a* and the layer thickness regulating member 7 or the electrical resistance between the developing roller shaft 2*a* and the electrical contact surface is greater than a preset value. In other words, an insulating setting is formed between the electrical contact surface and the developing roller shaft 2*a*.

In other optional embodiments, the developing roller body 2*b* itself is constructed of an insulating material, or the developing roller body 2*b* is provided with an insulating material or non-metallic material covering the outer peripheral surface.

In this embodiment, the layer thickness regulating member can be electrically connected to the power supply component of the image forming device through the conductive member, thereby supplying power to the developing cartridge and realizing the printing function of the developing cartridge. The layer thickness regulating member is fixed on the casing and can maintain stable contact with the conductive member, so that the power transmission can be more stable.

Embodiment 2

Embodiment 2 of the present application will be described below. The difference between this embodiment and Embodiment 1 is that the conductive member is different from that of Embodiment 1.

As shown in FIGS. 9-12, a conductive member 26 (interchangeably referred to as "electrode") is positioned at the second side 12 of the casing 1, and the conductive member 26 is at least partially supported on the bracket 5. The conductive member 26 includes a main body portion 261, a first contact portion 262 and a second contact portion 263. The main body portion 261 extends approximately in the first direction, and has a first end and a second end separated from each other in the first direction. The first contact portion 262 extends from the first end to form a plate-like structure. The first contact portion 262 has a contact side surface facing the left side. The contact side surface can contact the power supply component of the image forming device to achieve electrical connection and receive the power output by the power supply component. The first contact portion 262 is supported on the bracket 5. The second contact portion 263 is formed by bending and extending from the second end of the main body portion 261. The second contact portion 263 is used to electrically connect with the supply roller 3, and transmit the power received by the conductive member 26 to the supply roller 3. Specifically, the second contact portion 263 and the supply roller shaft 3*a* are connected to form a first end at the second side 12 of the casing 1 protruding from the surface of the casing 1 to form an electrical connection.

Figure 10:
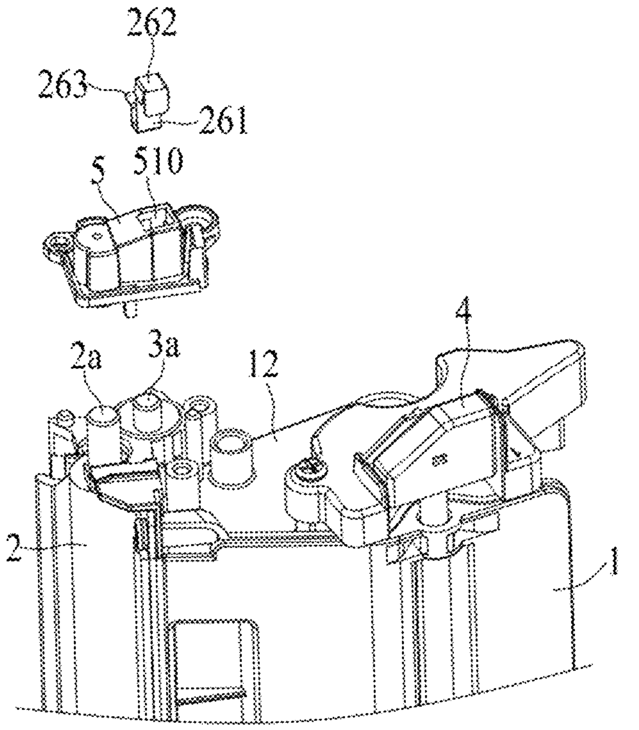
FIG. 10 is a partial exploded schematic view of the second side of the developing cartridge according to Embodiment 2 of the present application.
Figure 11:
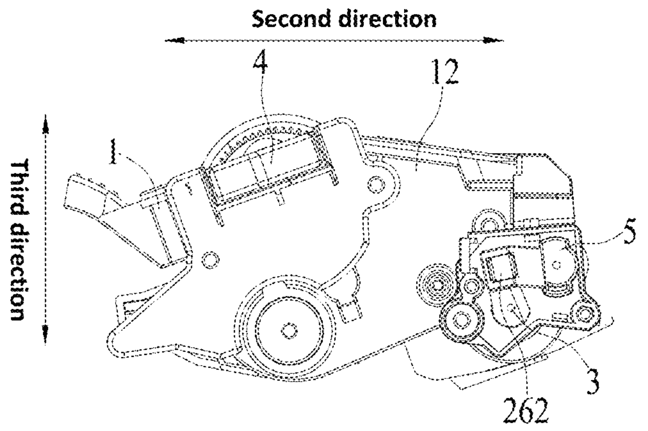
FIG. 11 is a schematic view of a front structure of the second side of the developing cartridge according to Embodiment 2 of the present application.
Figure 12:
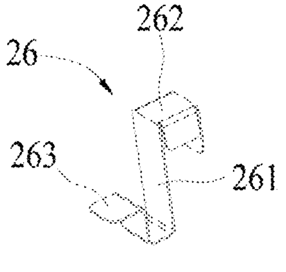
FIG. 12 is a schematic view of a three-dimensional structure of a conductive member of the developing cartridge according to Embodiment 2 of the present application.
Figure 13:
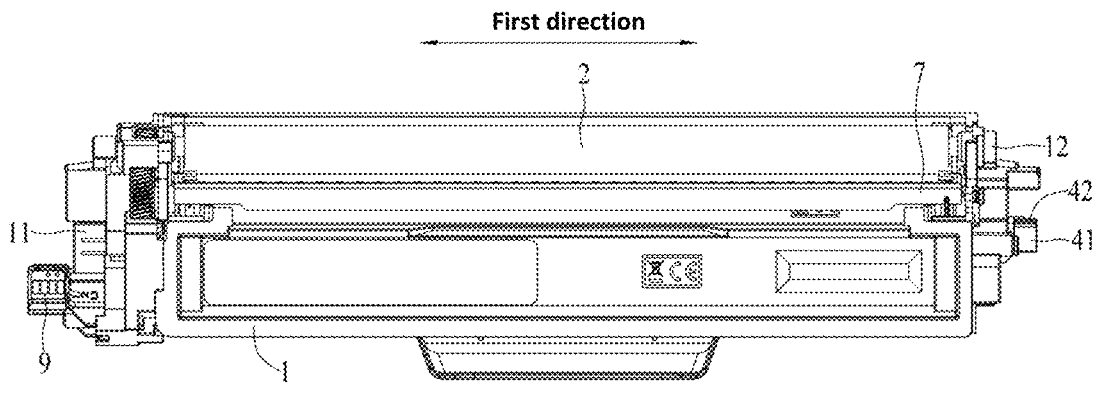
FIG. 13 is a schematic structural view of a developing cartridge according to Embodiment 3 of the present application from one angle.
Figure 14:
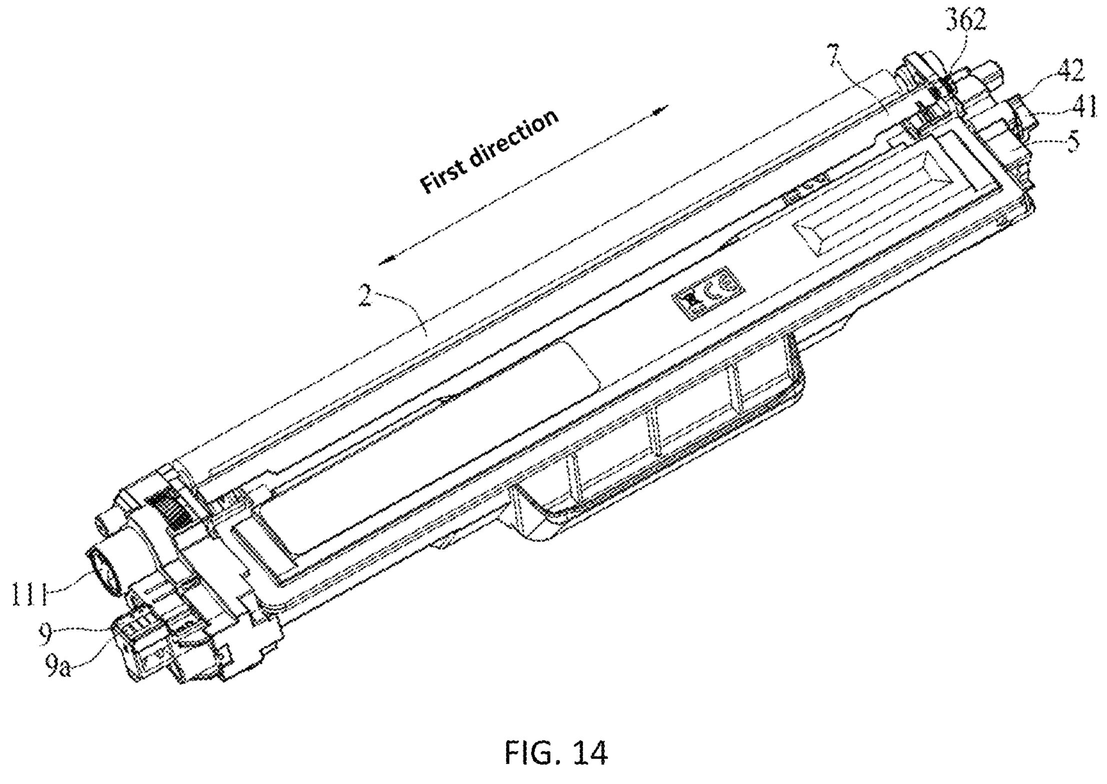
FIG. 14 is a schematic view of a three-dimensional structure of the developing cartridge according to Embodiment 3 of the present application from another angle.

As shown in FIG. 10, the bracket 5 is provided with a connection hole 510 at a position corresponding to the first contact portion 262, and the conductive member 26 is electrically connected to the supply roller 3 through the connection hole 510, and the main body portion is at least partially positioned in the connection hole 510. To make the connection between the conductive member 26 and the rotating supply roller 3 more stable, a conductive spring is provided between the second contact portion 263 of the conductive member 26 and the supply roller shaft 3*a* to offset the jumping of the supply roller 3 during the rotation process, thereby improving the stability of the electrical connection between the conductive member 26 and the supply roller shaft 3*a*. In this embodiment, the conductive member 26 is electrically connected to the supply roller 3 through the second contact portion 263. In other embodiments, the conductive member 26 may also include a third contact portion. The third contact portion may be electrically connected to the layer thickness regulating member 7 through a structure similar to the second contact portion 263, so that the conductive member 26 can be electrically connected to both the supply roller shaft 3*a* and the layer thickness regulating member 7.

The second contact portion 263 is closer to the casing 1 than the first contact portion 262 in the first direction. The first contact portion 262 is located on the left side of the second contact portion 263 in the first direction, the second contact portion 263 is located between the first contact portion 262 and the supply roller 3 in the first direction, and the second contact portion 263 is closer to the supply roller 3 than the first contact portion 262. In the second direction, the developing roller 2, the second contact portion 263 and the first contact portion 262 are arranged in sequence from front to rear, that is, the second contact portion 263 is located between the developing roller 2 and the first contact portion 262 in the second direction.

In this embodiment, the developing roller shaft 2*a* is insulated from the conductive member 26, or the developing roller shaft 2*a* does not receive external power through the conductive member 26, and only transmits power to the supply roller shaft 3*a* through the conductive member 26. An electrical resistance between the first contact portion 262 and the developing roller shaft 2*a* is greater than an electrical resistance between the first contact portion 262 and the supply roller shaft 3*a*, that is, the power on the developing roller body 2*b* needs to be transmitted through the supply roller 3 and the conductive member 26.

Embodiment 3

Figure 15:
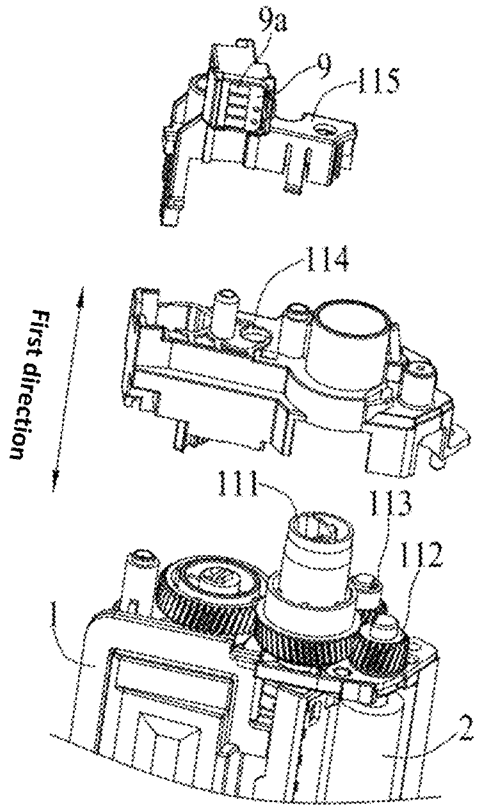
FIG. 15 is a partial exploded schematic view of a first side of the developing cartridge according to Embodiment 3 of the present application.

As shown in FIGS. 13 to 19, Embodiment 3 of the present application discloses a developing cartridge 100. The developing cartridge 100 is detachably mounted in an image forming device, and includes a casing 1 that can be filled with developer. The casing 1 includes a first side 11 and a second side 12 that are separated from each other in the first direction. The developing roller 2 is rotatably supported between the first side 11 and the second side 12 of the casing 1, and can rotate about a first rotation axis extending in the first direction. The supply roller 3 is rotatably supported between the first side 11 and the second side 12 of the casing 1, and can rotate about a second rotation axis extending in the first direction. As shown in FIG. 15, the developing cartridge 100 further includes an input gear 111, a developing roller gear 112, and a supply roller gear 113 positioned at the first side, and the input gear 111 can be meshed with a driving force input member (not shown) in the image forming device to receive a driving force from the image forming device and rotate. The input gear 111 is separately meshed with the developing roller gear 112 and the supply roller gear 113 to transmit the received driving force to the developing roller 2 and the supply roller 3 separately, thereby driving the developing roller 2 and the supply roller 3 to rotate. The first side 11 is further provided with a protective cover 114, a chip holder 115 and a storage unit 9. The protective cover 114 covers at least a part of the input gear 111, the developing roller gear 112 and the supply roller gear 113. In this embodiment, the storage unit 9 is mounted on the chip holder 115, and is mounted on the protective cover 114 together with the chip holder 115. The storage unit 9 is used to store relevant information of the developing cartridge 100, and has an electrical contact portion 9*a* exposed outside the protective cover 114.

The developing roller 2 includes a developing roller shaft 2*a* and a developing roller body 2*b*. The developing roller body 2*b* is made of elastic rubber, the developing roller shaft 2*a* is a cylindrical member extending along the first direction, and the developing roller shaft 2*a* is disposed through the developing roller body 2*b*. The developing roller body 2*b* is fixed on the developing roller shaft 2*a*, so that the developing roller body 2*b* can rotate synchronously with the developing roller shaft 2*a*. The developing roller shaft 2*a* is made of metal or conductive resin, or the developing roller shaft 2*a* is made of an insulating material. Alternatively, the developing roller shaft 2*a* and the developing roller body 2*b* are isolated by an insulating material, so that an insulating structure is formed between the developing roller shaft 2*a* and the developing roller body 2*b*. The supply roller 3 includes a supply roller shaft 3*a* and a supply roller body 3*b*. The supply roller body 3*b* is made of sponge. The supply roller shaft 3*a* is a cylindrical member extending along the first direction, and the supply roller shaft 3*a* is disposed through the supply roller body 3*b*. The supply roller body 3*b* is fixed on the supply roller shaft 3*a*, so that the supply roller body 3*b* can rotate synchronously with the supply roller shaft 3*a*. The supply roller shaft 3*a* is made of metal or conductive resin.

Figure 16:
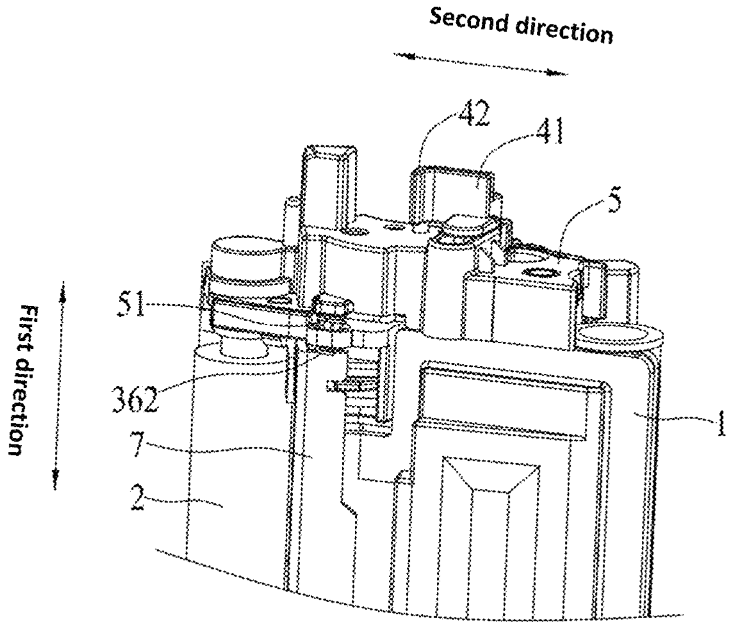
FIG. 16 is a schematic view of a three-dimensional structure of a second side of the developing cartridge according to Embodiment 3 of the present application.

As shown in FIG. 16, the developing cartridge 100 is further provided with a detection protrusion 41 on the second side 12 in the first direction. The detection protrusion 41 is used to be detected by a detection unit provided in the image forming device when the developing cartridge 100 is mounted in the image forming device, so as to verify whether the developing cartridge 100 is a new developing cartridge 100, and the service life of the developing cartridge 100, i.e., the number of printable pages of the developing cartridge 100, is further identified by means of the detection unit detecting the detection protrusion 41. A bracket 5 is provided on the same side of the developing cartridge 100 as the detection protrusion 41. The bracket 5 is constructed of insulating plastic, and the bracket 5 includes a developing roller bearing and a supply roller bearing. The developing roller 2 protrudes from a surface of the casing 1 on the second side 12 of the casing 1 to form a first end. The first end is rotatably borne on the developing roller bearing. The supply roller 3 protrudes from the surface of the casing 1 on the second side 12 of the casing 1 to form a second end. The second end is rotatably borne on the supply roller bearing.

The developing cartridge 100 further includes a layer thickness regulating member 7. The layer thickness regulating member 7 is positioned at a front end of the developing cartridge 100 in the second direction and adjacent to the developing roller 2. Specifically, the layer thickness regulating member 7 is positioned behind the developing roller 2 in the second direction, and the layer thickness regulating member 7 extends between the first side 11 and the second side 12 of the casing 1 in the first direction, and is used to adjust the thickness of developer attached to the developing roller 2, thereby improving the printing quality. The layer thickness regulating member 7 includes a blade holder 7*a* and a blade 7*b*, both of which extend in the first direction. The blade holder 7*a* is fixed to the casing 1 by a screw 8. One end of the blade 7*b* is fixed to the blade holder 7*a*, and the other end of the blade 7*b* abuts the developing roller 2. Specifically, the other end of the blade 7*b* abuts the outer surface of the developing roller body 2*b*, and after the developer is attached to the developing roller body 2*b*, the thickness of the developer attached to the surface of the developing roller body 2*b* is adjusted.

An electrode 42 is positioned at the second side 12 of the casing 1. The electrode 42 is used to contact a power supply component of the image forming device to achieve electrical connection and receive power output by the power supply component. In this embodiment, the electrode 42 is integrally disposed with the detection protrusion 41, and the electrode 42 can move together with the detection protrusion 41. Specifically, the detection protrusion 41 is disposed to be made of a conductive material, preferably, conductive resin. The electrode 42 is formed by extending from one side of the detection protrusion 41, and the power output by the power supply component can be transmitted to the detection protrusion 41 through the electrode 42.

Figure 17:
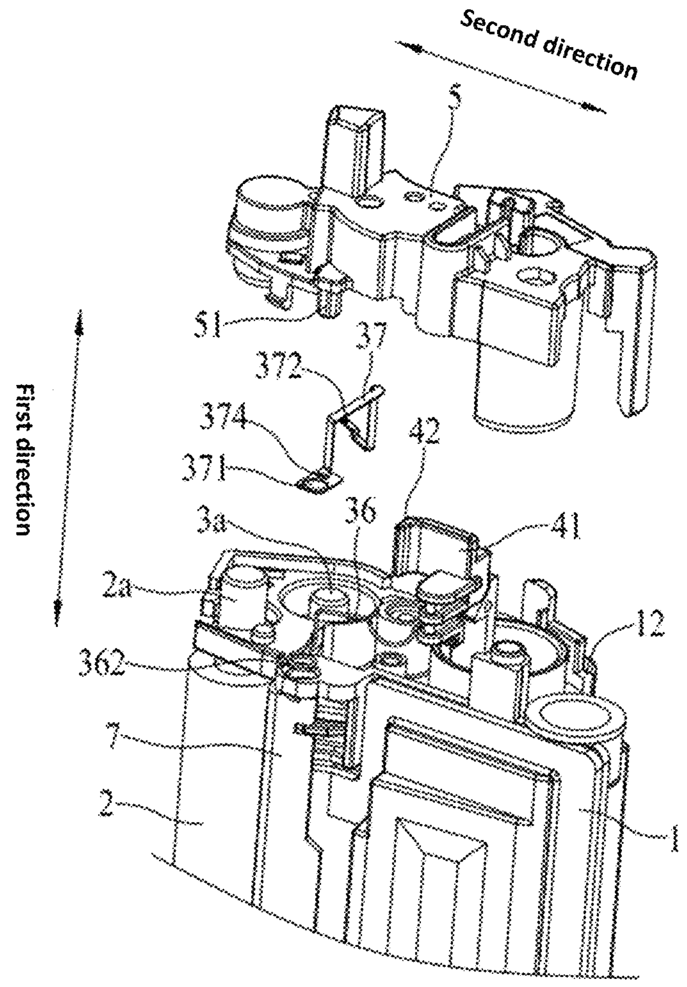
FIG. 17 is a partial exploded schematic view of the second side of the developing cartridge according to Embodiment 3 of the present application.
Figure 18:
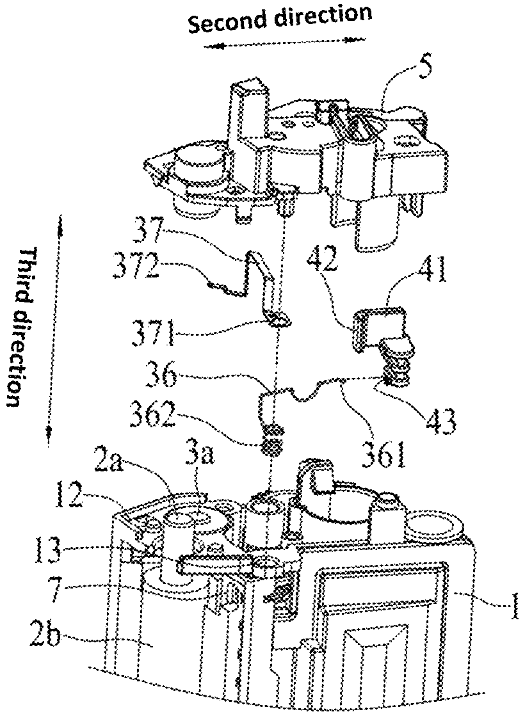
FIG. 18 is a partial exploded schematic view of the second side of the developing cartridge according to Embodiment 3 of the present application.
Figure 19:
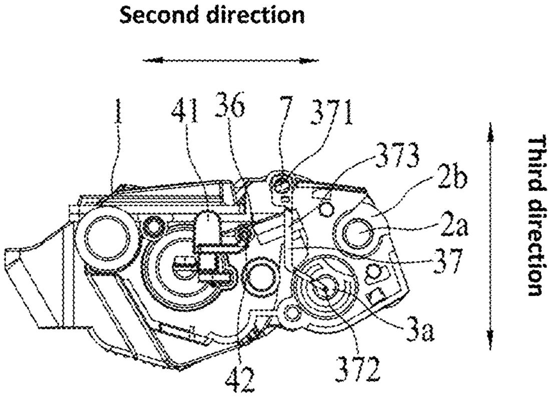
FIG. 19 is a schematic view of a front structure of the second side of the developing cartridge according to Embodiment 3 of the present application.

As shown in FIGS. 17 and 18, a conductive assembly is positioned at the second side 12. The conductive assembly is at least partially supported on the bracket 5. The conductive assembly includes a first conductive member 36 and a second conductive member 37. The first conductive member 36 is electrically connected to the second conductive member 37. The first conductive member 36 is electrically connected to the electrode 42 to access the power output by the power supply component. The first conductive member 36 is configured as a metal member, preferably a bendable and extendable metal wire or metal sheet. The first conductive member 36 includes a first contact portion 361, a second contact portion 362, and a bent and extended first connection portion connected between the first contact portion 361 and the second contact portion 362. The first contact portion 361 abuts the detection protrusion 41 and can move together with the detection protrusion 41. Specifically, a part of the first connection portion close to the first contact portion 361 is configured as an elastic arm. The elastic arm can be elastically deformed so that the first contact portion 361 moves together with the detection protrusion 41 and maintains the contact connection of the first contact portion 361 following the detection protrusion 41. The second contact portion 362 is connected to the layer thickness regulating member 7. Specifically, the second contact portion 362 contacts the blade holder 7*a* of the layer thickness regulating member 7 to form an electrical connection, and transmits the power received by the first conductive member 36 to the layer thickness regulating member 7. The second contact portion 362 is constructed as an elastic member. The elastic member is configured to be elastically deformable in a left and right direction, so that the second contact portion 362 is in more stable contact with the layer thickness regulating member 7. Specifically, the second contact portion 362 is in elastic contact with the layer thickness regulating member 7. The bracket 5 is provided with a fixing column 51, the second contact portion 362 is configured as a compression spring structure, and the compression spring is sleeved and fixed on the fixing column 51, so that the second contact portion 362 can maintain stable contact with the layer thickness adjustment member 7. The casing 1 is provided with a positioning hole 13 corresponding to the second contact portion 362, the second contact portion 362 is mounted in the positioning hole 13, and the fixing column 51 is at least partially inserted into the positioning hole 13, so that the second contact portion 362 is roughly positioned at a position at least partially overlapping with the layer thickness adjustment member 7 in the first direction. When the first contact portion 361 contacts the detection protrusion 41, the first connection portion is in an elastic deformation state, and the elastic deformation force generated by the first connection portion causes the first contact portion 361 to maintain close contact with the detection protrusion 41. Specifically, the detection protrusion 41 is provided with a limiting groove 43, and the first contact portion 361 is at least partially disposed in the limiting groove 43 to prevent the first contact portion 361 from being separated from the detection protrusion 41.

The second conductive member 37 is configured as a conductive metal sheet. The second conductive member 37 includes a third contact portion 371, a fourth contact portion 372, and a bent and extended second connection portion 373 connected between the third contact portion 371 and the fourth contact portion 372. The third contact portion 371 is connected to the first conductive member 36, specifically, the second contact portion 362 of the first conductive member 36, and the fourth contact portion 372 is connected to the supply roller shaft 3*a*, wherein the third contact portion 371 has a fixing hole 374, a fixing column 51 is provided on the bracket 5, and the fixing hole 374 is sleeved on the fixing column 51 to fix the third contact portion 371 on the bracket 5. It can be understood that the number of fixing columns 51 on the bracket 5 may be multiple. The second conductive member 37 is provided with multiple fixing holes 374 in a one-to-one correspondence with the fixing columns, and the second conductive member 37 is fixed to the bracket 5 by the cooperation of the multiple fixing columns and the multiple fixing holes. The fourth contact portion 372 has a contact bump. The contact bump is formed by protruding and extending from the fourth contact portion 372 to the supply roller shaft 3*a*, and maintains close contact between the fourth contact portion 372 and the supply roller shaft 3*a*. In the first direction, the third contact portion 371, the second contact portion 362 and the layer thickness regulating member 7 are arranged in sequence, and the third contact portion 371 and the layer thickness regulating member 7 can compress the second contact portion 362 between the two to maintain stable contact between the three.

In this embodiment, the developing roller shaft 2*a* is insulated from the conductive assembly, or the developing roller 2 does not receive external power through the conductive assembly, transmits power through the first conductive member 36 and the layer thickness regulating member 7, and transmits power to the supply roller 3 through the second conductive member 37. An electrical resistance between the first contact portion 361 and the developing roller shaft 2*a* is greater than an electrical resistance between the first contact portion 361 and the layer thickness regulating member 7, and an electrical resistance between the first contact portion 361 and the developing roller shaft 2*a* is greater than an electrical resistance between the first contact portion 361 and the supply roller 3.

Embodiment 4

Figure 20:
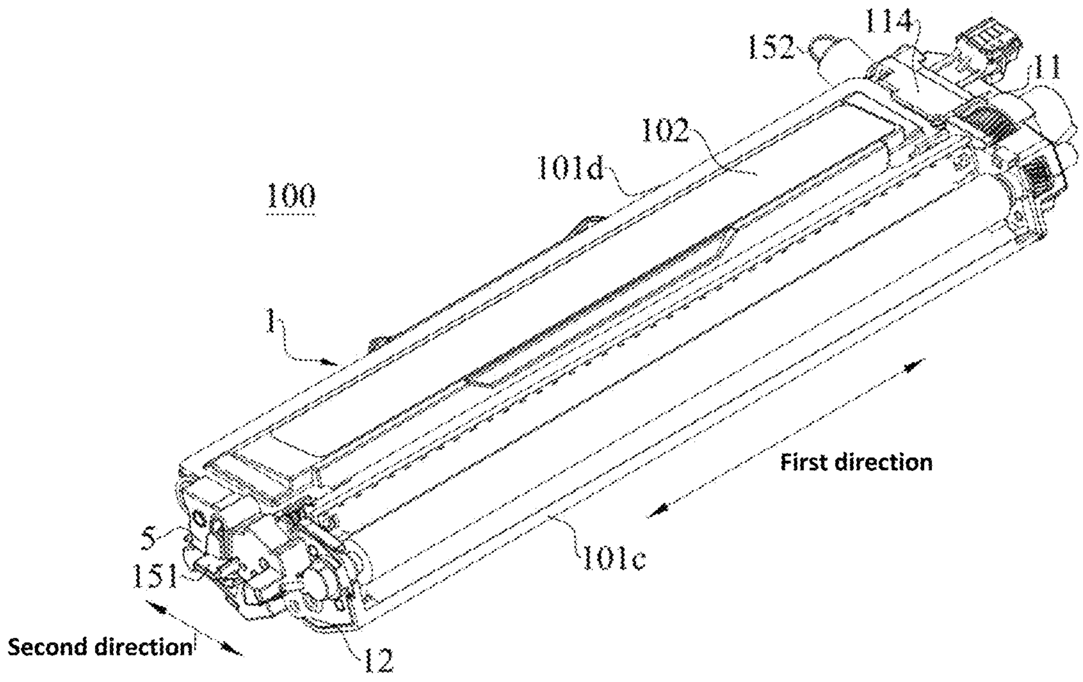
FIG. 20 is a schematic view of a three-dimensional structure of a developing cartridge according to Embodiment 4 of the present application.
Figure 21:
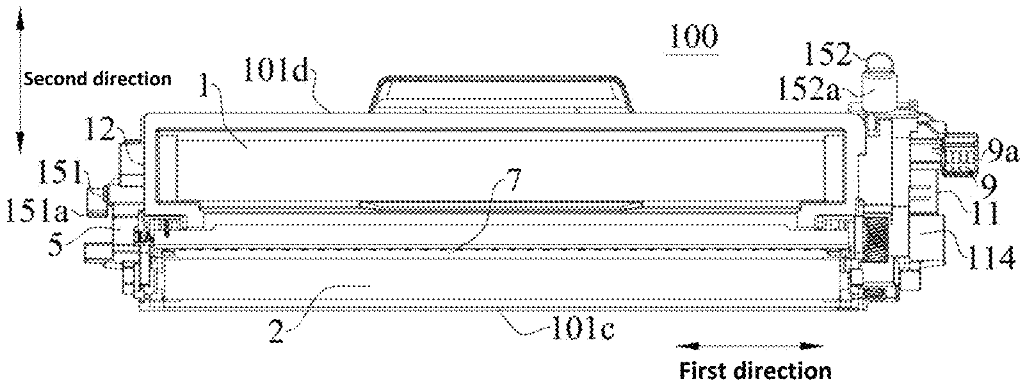
FIG. 21 is a top view of the developing cartridge according to Embodiment 4 of the present application in a third direction.
Figure 22:
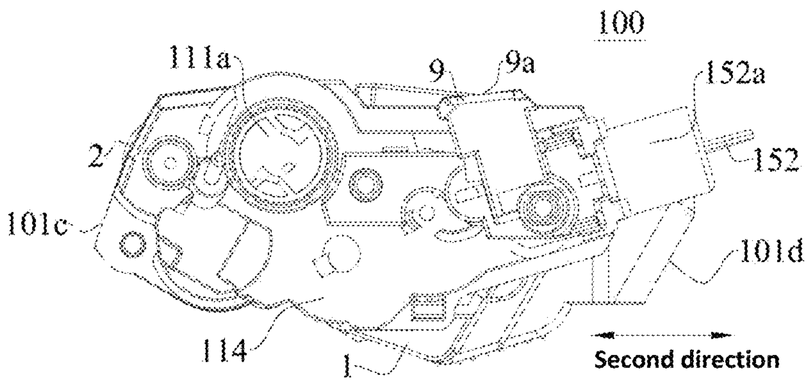
FIG. 22 is a side view of the developing cartridge according to Embodiment 4 of the present application viewed from a first side in a first direction.
Figure 23:
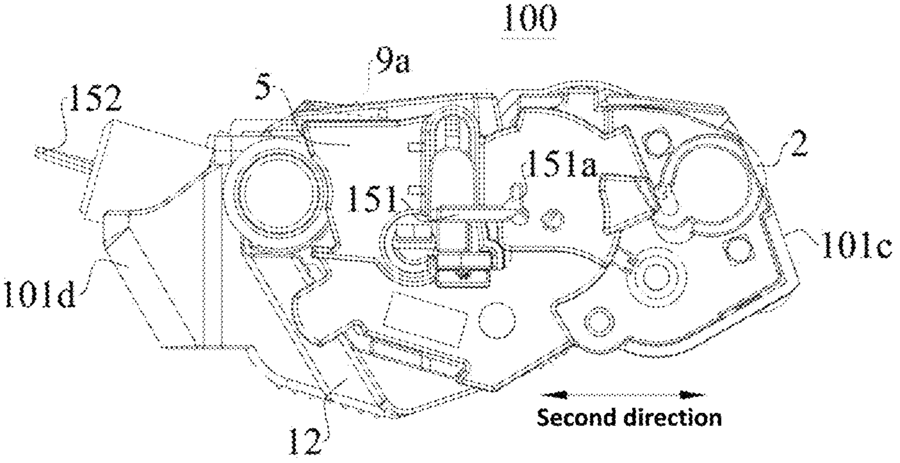
FIG. 23 is a side view of the developing cartridge according to Embodiment 4 of the present application viewed from a second side in the first direction.

FIGS. 20-34 show Embodiment 4 of the present application. The same parts in Embodiment 4 as those in Embodiment 2 are not repeated here. Specifically, FIGS. 20-22 show a developing cartridge 100 of the present application. The developing cartridge 100 can be detachably mounted to an electronic photographic imaging device (hereinafter referred to as "imaging device") and complete an imaging operation together with the imaging device. To make the imaging operation smoother while improving the imaging quality of the developing cartridge 100, a power supply component (not shown) for supplying power to the developing cartridge 100 and a detection member (not shown) for detecting the state of the developing cartridge 100 are provided inside the imaging device. After the developing cartridge 100 is mounted to the imaging device, the developing cartridge 100 may be switched between a first state and a second state. The developing cartridge 100 transmits information of the developing cartridge 100 to the detection member of the imaging device through different switching frequencies between the first state and the second state, thereby helping the imaging device to identify the developing cartridge 100. The developing cartridge 100 includes a power receiving member that can be electrically connected to a power supply component in the imaging device, a grounding member that can be electrically connected to a grounding member in the imaging device, and an opening and closing member for controlling the electrical connection between the power receiving member and the grounding member to be connected or disconnected. The developing cartridge 100 controls the electrical connection between the power receiving member and the grounding member by means of the opening and closing member to achieve switching of the developing cartridge

100 between the first state and the second state, so that the developing cartridge 100 can transmit information of the developing cartridge 100 to the imaging device. Specifically, when the opening and closing member controls the electrical connection between the power receiving member and the grounding member to be connected, the power supply component inside the imaging device is electrically connected to the grounding member inside the imaging device, and the developing cartridge 100 is in the second state. When the opening and closing member controls the electrical connection between the power receiving member and the grounding member to be disconnected, the developing cartridge 100 is in the first state.

As shown in FIGS. 20-23, the developing cartridge 100 includes a casing 1, the casing 1 has a first side 11 and a second side 12 separated from each other in the first direction, and the casing 1 has a third side 101*c* and a fourth side 101*d* separated from each other in the second direction. The casing 1 includes a developer bin 102 as a main body part. The developer bin 102 is used to accommodate developer. The casing 1 further includes a protective cover 114 that can be detachably mounted on a first side 11 of the developer bin 102 and a bracket 5 that can be detachably mounted on a second side 12 of the developer bin 102. The first side 11 of the casing 1 is provided with a gear train for receiving a driving force from the outside of the developing cartridge 100 and driving internal members of the developing cartridge 100 to move, a chip 9 (storage unit) for storing information of the developing cartridge 100, and an elastic conductor 152 as the grounding member. The elastic conductor 152 may contact a grounding metal frame (not shown) in the imaging device to form an electrical connection. During the process of mounting the developing cartridge 100 to the imaging device, the elastic conductor 152 may generate elastic deformation to adapt to the distance between the elastic conductor 152 and the grounding metal frame, so that the electrical connection between the elastic conductor 152 and the grounding metal frame is more stable. The elastic conductor 152 is preferably constructed as a conductive spring. The chip 9 has an electrical contact surface 9*a*. In the state where the developing cartridge 100 is mounted to the imaging device, the electrical contact surface 9*a* is electrically connected to an electrical connection member (not shown) inside the imaging device, so that the imaging device can read the information on the chip 9. The second side 12 of the casing 1 is provided with an electrode 151 as a grounding member. The protective cover 114 is used to cover at least a part of the gear train to protect the gear train. The bracket 5 is used to cover at least a part of the electrode 151 to protect the electrode 151.

Figure 24:
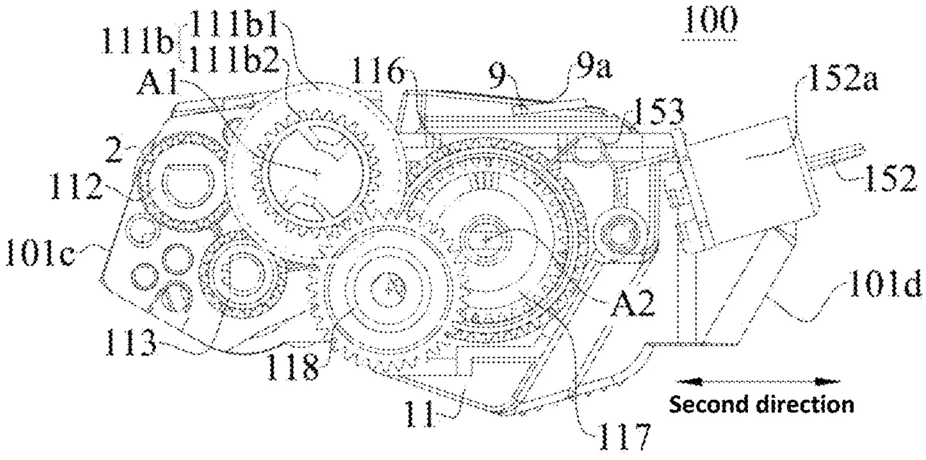
FIG. 24 is a partial exploded schematic view of the developing cartridge according to Embodiment 4 of the present application.
Figure 25:
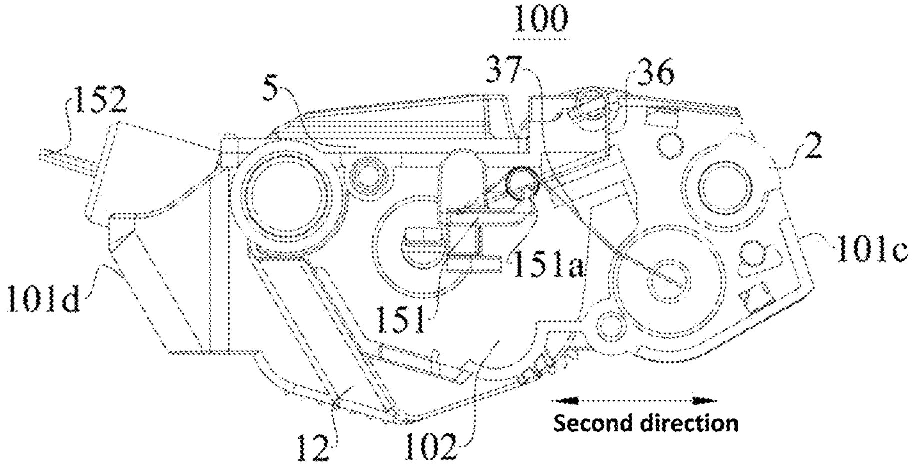
FIG. 25 is a side view of the developing cartridge according to Embodiment 4 of the present application viewed from the first side in the first direction, in a state where a first protective cover is hidden.

As shown in FIGS. 24-25, the gear train includes but is not limited to an input gear 111, a developing roller gear 112, a supply roller gear 113, an agitator gear 116, a driving gear 117 as an opening and closing member, and at least one transmission gear. The input gear 111 has a coupling portion 111*a* and a gear portion 111*b*. The coupling portion 111*a* is exposed to the first side 11 of the casing 1 through a through hole provided on the protective cover 114. In the state where the developing cartridge 100 is mounted to the imaging device, the coupling portion 111*a* may be connected to a driving member (not shown) inside the imaging device to receive the driving force of the imaging device, and drive the input gear 111 to rotate about a coupling gear axis A1 extending in the first direction. The developing roller gear 112, the supply roller gear 113 and the agitator gear 116 are all meshed and connected with the gear portion 111*b* of the input gear 111 to receive the driving force of the input gear 111, thereby driving the developing roller gear 112, the supply roller gear 113 and the agitator gear 116 to rotate about their respective axes extending in the first direction. The developing cartridge 100 is further provided with a developing roller 2, a supply roller 3 and an agitator 140. The developing roller gear 112, the supply roller gear 113 and the agitator gear 116 are connected to the ends on the first side 11 of the developing roller 2, the supply roller 3 and an agitator 140 in the first direction, respectively. The developing roller gear 112, the supply roller gear 113 and the agitator gear 116 may drive the developing roller 2, the supply roller 3 and the agitator 140 to rotate about their respective axes extending in the first direction to complete the conveyance of the developer, respectively. The developing roller 2 is located on the third side 101*c* of the casing 1 in the second direction. A layer thickness regulating member 7 is provided between the developing roller 2 and the developer bin 102. The layer thickness regulating member 7 is used to control the thickness of the developer attached to the outer surface of the developing roller 2. The electrode 151 has an electrical contact part 151*a* exposed on the second side 12 of the casing 1 in the first direction. In the state where the developing cartridge 100 is mounted to the imaging device, the electrical contact part 151*a* contacts the power supply component of the imaging device to receive the power of the imaging device and is electrically connected to at least one of the developing roller 2, the supply roller 3 and the layer thickness regulating member 7. In this embodiment, as shown in FIG. 8, the electrical contact part 151*a* is electrically connected to the supply roller 3 through the second conductive member 37, and the electrical contact part 151*a* is electrically connected to the layer thickness regulating member 7 through the first conductive member 36.

Figure 28:
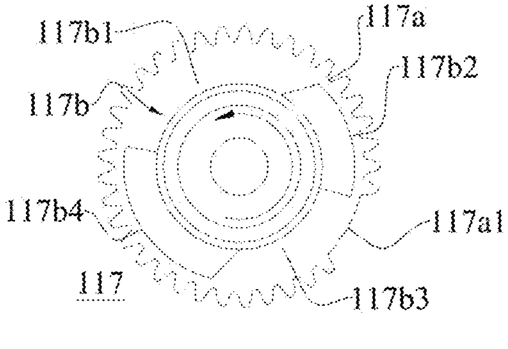
FIG. 28 is a side view of a driving gear according to Embodiment 4 of the present application viewed from the first side in the first direction.
Figure 30:
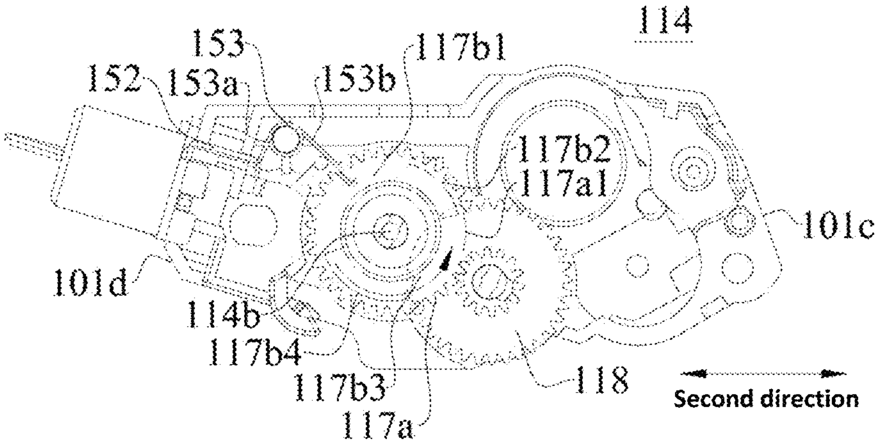
FIG. 30 is a side view of the first protective cover according to Embodiment 4 of the present application viewed from the second side in the first direction when the driving gear is in an initial position.
Figure 31:
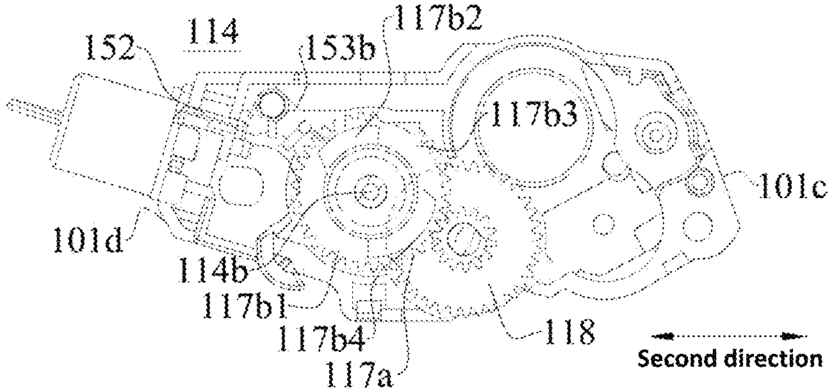
FIG. 31 is a side view of the first protective cover according to Embodiment 4 of the present application viewed from the second side in the first direction, in a state where a first convex portion of the driving gear faces a second end.
Figure 32:
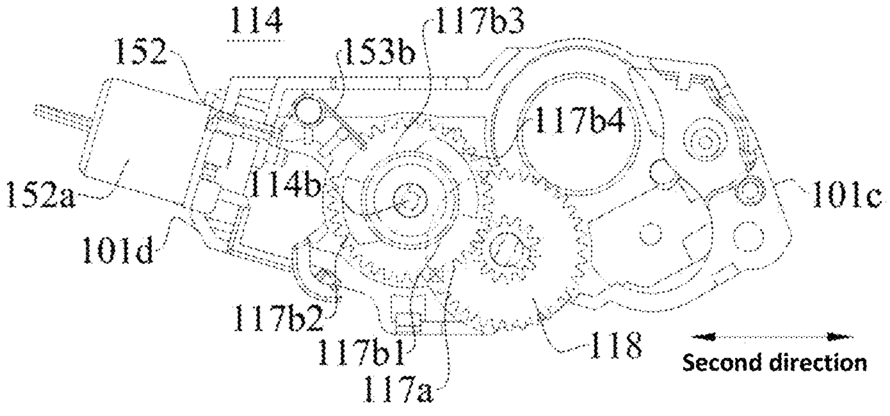
FIG. 32 is a side view of the first protective cover according to Embodiment 4 of the present application viewed from the second side in the first direction, in a state where a second concave portion of the driving gear faces the second end.
Figure 33:
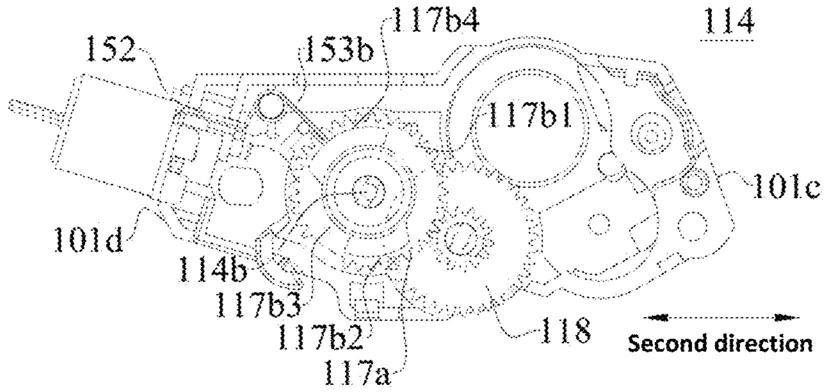
FIG. 33 is a side view of the first protective cover according to Embodiment 4 of the present application viewed from the second side in the first direction, in a state where a second convex portion of the driving gear faces the second end.
Figure 34:
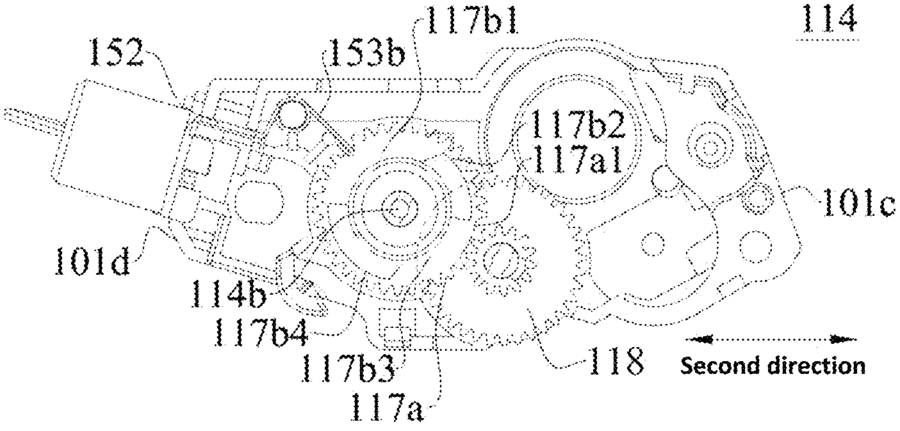
FIG. 34 is a side view of the first protective cover according to Embodiment 4 of the present application viewed from the second side in the first direction when the driving gear is in a final position.

As shown in FIG. 25, the driving gear 117 may control the electrical connection between the electrode 151 and the elastic conductor 152 in the developing cartridge 100 to be connected or disconnected. Specifically, the driving gear 117 is made of a conductive material, and the driving gear 117 is preferably made of a conductive resin material. A conductive torsion spring 153 for conducting electricity is provided between the driving gear 117 and the elastic conductor 152. The conductive torsion spring 153 has a first end 153*a* connected to the elastic conductor 152 and a second end 153*b* that can be electrically connected to the driving gear 117. The second end 153*b* is closer to the driving gear 117 than the first end 153*a* in the second direction and the third direction. An electrical connector 154, which extends from the first side 11 of the casing 1 to the second side 12 of the casing 1 in the first direction to electrically connect the electrode 151 and the driving gear 117, is provided between the driving gear 117 and the electrode 151. Specifically, in this embodiment, the electrical connector 154 is configured as a conductive rod penetrating the interior of the agitator 140. To ensure the connection between the driving gear 117 and the conductive rod, the driving gear 117 is substantially coaxial with the agitator gear 116, and the driving gear 117 and/or the conductive rod penetrate the agitator gear 116 in the first direction. In other implementations of this embodiment, a roller shaft of the developing roller 2, a roller shaft of the supply roller 3, and the layer thickness regulating member 7 may all be used as the electrical connector 154 electrically connecting the electrode 151 and the driving gear 117. Of course, these are not limiting. The electrical connector 154 extends from the first side 11 of the casing 1 to the second side 12 to electrically connect the electrode 151 and the driving gear 117. As shown in FIG. 28, the driving gear 117 includes a tooth portion 117*a* for receiving the driving force and a power receiving portion 117*b* that can be electrically connected to the conductive torsion spring 153. The power receiving portion 117*b* includes at least one concave portion that cannot contact the conductive torsion spring 153, and at least one convex portion that can contact the conductive torsion spring 153. In the state where the driving gear 117 receives the driving force and rotates, the concave portion and the convex portion of the driving gear 117 rotate in sequence to the direction of the second end 153*b* of the conductive torsion spring 153. In other words, the driving gear 117 can switch between a contact state and a non-contact state with the conductive torsion spring 153. Specifically, as shown in FIG. 28, in this embodiment, the power receiving portion 117*b* includes a first concave portion 117*b*1, a first convex portion 117*b*2, a second concave portion 117*b*3 and a second convex portion 117*b*4. The tooth portion 117*a* of the driving gear 117 is transmission-connected to the gear portion 111*b* of the input gear 111 through a connecting gear 118. The driving gear 117 is rotatable about a driving gear axis A2 extending in a first direction. The first concave portion 117*b*1, the first convex portion 117*b*2, the second concave portion 117*b*3 and the second convex portion 117*b*4 are arranged in sequence along the rotation direction of the driving gear 117. In the radial direction of the driving gear 117, the distance between the first concave portion 117*b*1 and the second concave portion 117*b*3 and the driving gear axis A2 is smaller than the distance between the first convex portion 117*b*2 and the second convex portion 117*b*4 and the driving gear axis A2. As shown in FIG. 30, before the driving gear 117 receives the driving force, the first concave portion 117*b*1 of the driving gear 117 is directed toward the second end 153*b* of the conductive torsion spring 153. At this time, the driving gear 117 is not in contact with the conductive torsion spring 153, that is, the electrical connection between the electrode 151 and the elastic conductor 152 is in a disconnected state at this time. Thus, the developing cartridge 100 is in the first state. After the driving gear 117 receives the driving force and rotates, the driving gear 117 gradually rotates from the first concave portion 117*b*1 to the first convex portion 117*b*2 toward the second end 153*b*. Then, as shown in FIG. 31, the driving gear 117 rotates toward the second end 153*b* to the range where the first convex portion 117*b*2 is located. At this time, the first convex portion 117*b*2 of the driving gear 117 is in contact with the second end 153*b* of the conductive torsion spring 153, thereby establishing an electrical connection between the electrode 151 and the elastic conductor 152. Thus, the developing cartridge 100 is in the second state. Next, as shown in FIGS. 32-33, the driving gear 117 rotates toward the second end 153*b* to the range of the second concave portion 117*b*3 and the range of the second convex portion 117*b*4 in sequence. When the driving gear 117 is in the range of the second concave portion 117*b*3 toward the second end 153*b*, the developing cartridge 100 is in the first state. When the driving gear 117 is in the range of the second convex portion 117*b*4 toward the second end 153*b*, the developing cartridge 100 is in the second state. Finally, as shown in FIG. 34, the driving gear 117 is returned to the range of the first concave portion 117*b*1 toward the second end 153*b* to complete the detected process of transmitting information to the imaging device, and the developing cartridge 100 transmits the information of the developing cartridge 100 to the imaging device by means of the switching frequency between the first state and the second state where the developing cartridge 100 is, in the above process. The above arrangement of the concave and convex portions is not limiting. It should be noted that the concave and convex portions on the developing cartridge 100 may be arranged differently, causing the developing cartridge 100 to presented at different switching frequencies, so that the developing cartridge 100 transmits different information to the imaging device, so as to help the imaging device to identify different developing cartridges.

Figure 29:
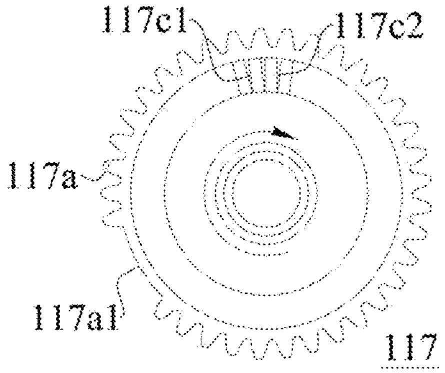
FIG. 29 is a side view of the driving gear according to Embodiment 4 of the present application viewed from the second side in the first direction.

Further, as shown in FIGS. 28-29, the driving gear 117 is provided with a first limiting groove 117*c*1 and a second limiting groove 117*c*2 on a side close to the protective cover 114 in the first direction. The first limiting groove 117*c*1 is adjacent to the second limiting groove 117*c*2. The first limiting groove 117*c*1 is located downstream of the second limiting groove 117*c*2 in the rotation direction of the driving gear 117. The tooth portion 117*a* of the driving gear 117 is constructed as a missing tooth structure. The driving gear 117 is provided with a missing tooth portion 117*a*1. An elastic protrusion 114*a* cooperating with the first limiting groove 117*c*1 and the second limiting groove 117*c*2 extends from the inner side of the protective cover 114 in the first direction. As shown in FIG. 30, before the driving gear 117 is forced to rotate, the elastic protrusion 114*a* cooperates with the first limiting groove 117*c*1 so that the driving gear 117 is maintained in an initial position. At the initial position, the upstream end of the tooth portion 117*a* in the rotation direction of the driving gear 117 faces the connecting gear 118, and the upstream end of the tooth portion 117*a* in the rotation direction of the driving gear 117 is meshed and connected with the connecting gear 118. Meanwhile, at the initial position, the driving gear 117 is in the range of the first concave portion 117*b*1 toward the second end 153*b*. As shown in FIG. 34, after the driving gear 117 is driven by the driving force to complete the detected process, the driving gear 117 rotates to a final position of the driving gear 117. At this time, the elastic protrusion 114*a* cooperates with the second limiting groove 117*c*2 to maintain the driving gear 117 in the final position. At the final position, the missing tooth portion 117*a*1 of the driving gear 117 faces the connecting gear 118, so that the driving gear 117 no longer receives the driving force of the input gear 111. Meanwhile, at the final position, the driving gear 117 is in the range of the first concave portion 117*b*1 toward the second end 153*b*, and the developing cartridge 100 maintains the first state, so that the developing cartridge 100 can perform an imaging operation normally.

Figure 26:
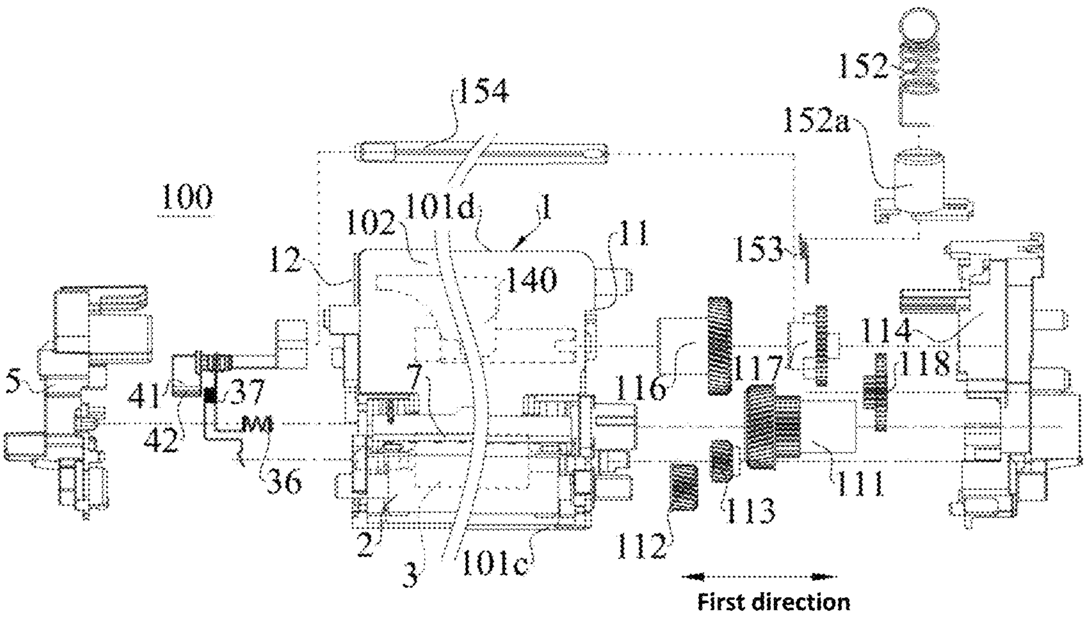
FIG. 26 is a side view of the first protective cover according to Embodiment 4 of the present application viewed from the second side in the first direction.
Figure 27:
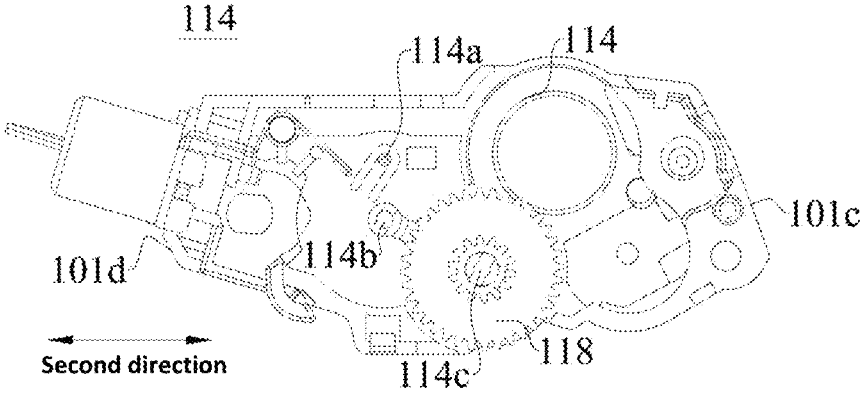
FIG. 27 is a side view of the developing cartridge according to Embodiment 4 of the present application viewed from the second side in the first direction, in a state where a second protective cover is hidden.

As shown in FIGS. 24-26, the gear portion 111*b* of the input gear 111 includes a first gear portion 111*b*1 and a second gear portion 111*b*2. The first gear portion 111*b*1 is connected to the agitator gear 116, and the second gear portion 111*b*2 is meshed and connected to the driving gear 117 through a connecting gear 118. The connecting gear 118 is located between the input gear axis A1 and the driving gear axis A2 in the second direction. The driving gear 117 and the connecting gear 118 are rotatably supported by a first support column 114*b* and a second support column 114*c* extending in the first direction from the inner side of the protective cover 114, respectively. The driving gear 117 can rotate relative to the agitator gear 116, thereby reducing the mutual interference between the agitator gear 116 and the driving gear 117 and improving the stability of the driving gear 117. The connecting gear 118 is constructed as a double gear, and the connecting gear 118 has a large gear portion and a small gear portion. The large gear portion is connected to the input gear 111, and the small gear portion is connected to the driving gear 117. The first gear portion 111*b*1 and the second gear portion 111*b*2 are arranged in the first direction.

Meanwhile, the diameter of the first gear portion 111*b*1 is larger than the diameter of the second gear portion 111*b*2 to reduce the rotation speed of the driving gear 117, further improving the stability of the driving gear 117.

Optionally, the elastic conductor 152 may be integrally provided with the conductive torsion spring 153, an end of the elastic conductor 152 close to the driving gear 117 may replace the function of the second end 153*b* of the conductive torsion spring 153, and the elastic conductor 152 may have the same technical effect.

Preferably, as shown in FIGS. 21-22, the electrical contact surface 9*a* and the elastic conductor 152 are positioned at the same side in the first direction. The electrical contact surface 9*a* is located on the first side 11 of the casing 1 in the first direction. The electrical contact surface 9*a* is close to the fourth side 101*d* of the casing 1 in the second direction. The elastic conductor 152 is located on the first side 11 of the casing 1 in the first direction. The elastic conductor 152 is located on the fourth side 101*d* of the casing 1 in the second direction. The elastic conductor 152 as the grounding terminal is close to the electrical contact surface 9*a*, which can reduce the interference between the electrical contact surface 9*a* and the electrical connection of the imaging device when the imaging device reads the information of the chip 9. In addition, the electrical contact part 151*a* is located on the second side 12 of the casing 1 in the first direction, that is, the electrical contact part 151*a* is opposite to the electrical contact surface 9*a* and the elastic conductor 152 in the first direction, reducing the mutual interference between the two.

Further, the outer surface of the elastic conductor 152 is provided with a protective cover 152*a* for protecting the elastic conductor 152, and at least a part of the elastic conductor 152 is exposed outside the protective cover 152*a*.

Embodiment 5

Figure 35:
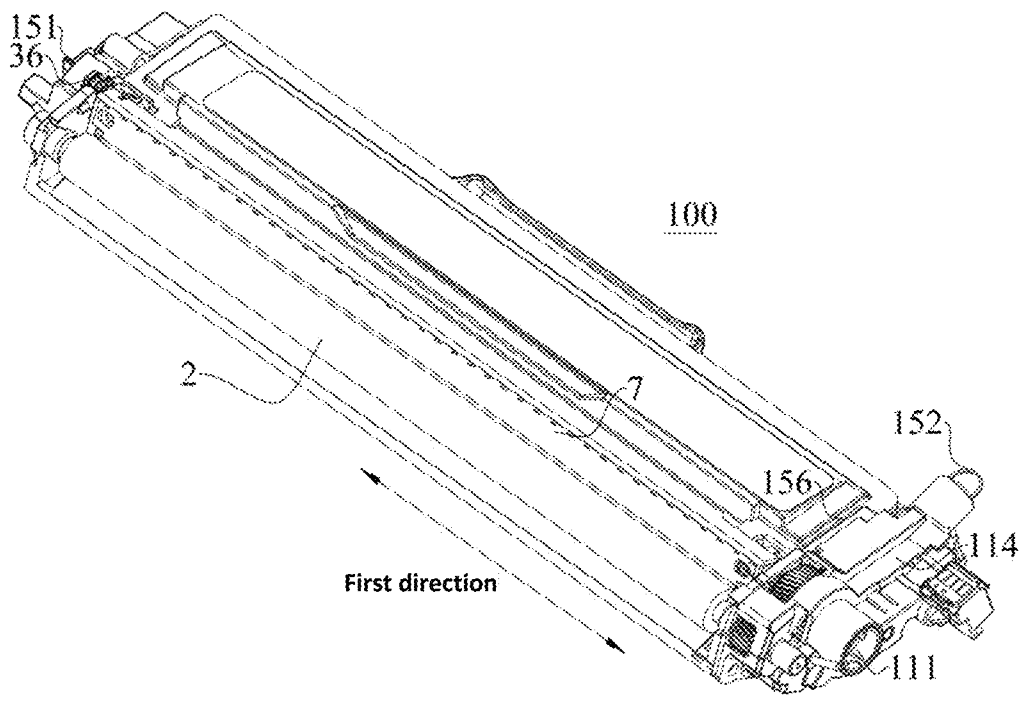
FIG. 35 is a schematic view of a three-dimensional structure of a developing cartridge according to Embodiment 5 of the present application.
Figure 36:
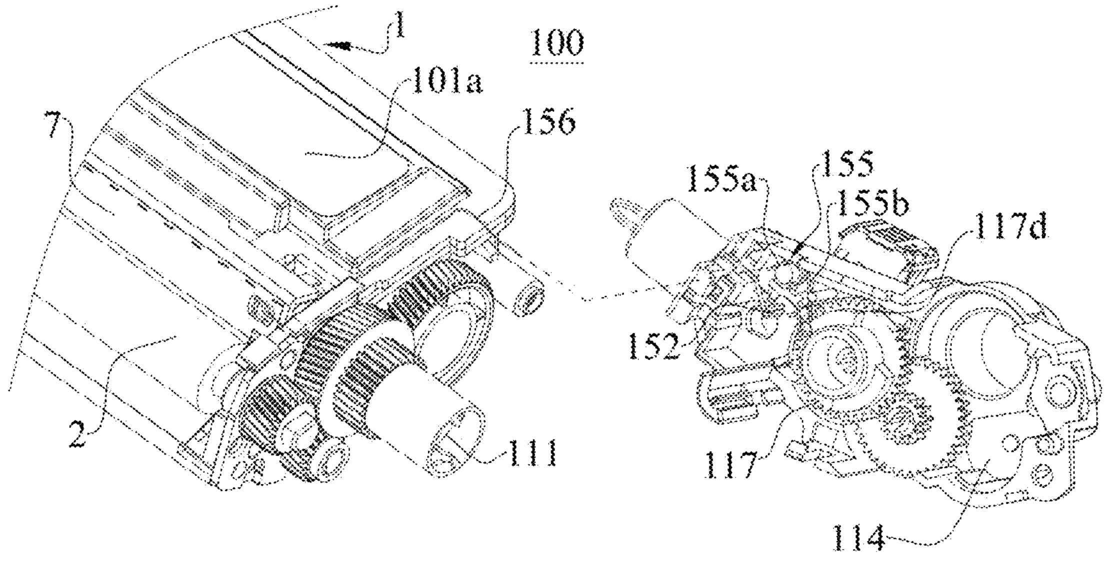
FIG. 36 is a partial schematic view of a first protective cover decomposed from the developing cartridge according to Embodiment 5 of the present invention.

Embodiment 5 of the present invention is shown in FIGS. 35-40. The same parts in Embodiment 5 as those in Embodiment 4 are not repeated here. The difference between Embodiment 5 and Embodiment 4 is that the driving gear as the opening and closing member in the developing cartridge 100 of this embodiment is different from the driving gear in Embodiment 4. Specifically, as shown in FIGS. 35-36, in this embodiment, the driving gear 117 is made of an insulating material, and the driving gear 117 is preferably made of a POM material. In addition, in this embodiment, a toggle torsion spring 155 different from that in the above embodiment is provided between the driving gear 117 and the elastic conductor 152, and the toggle torsion spring 155 has a fixed end and a movable end. In this embodiment, the toggle torsion spring 155 includes a first end 155*a* and a second end 155*b*. The first end 155*a* of the toggle torsion spring 155 is set as the fixed end, and a fixed electrical connection is maintained between the first end 155*a* and an electrode 151. The second end 155*b* of the toggle torsion spring 155 is set as the movable end. The second end 155*b* may accept an urging force of the driving gear 117 and move between a first position where the electrical connection is disconnected without contacting the elastic conductor 152 and a second position where the electrical connection is established by contacting the elastic conductor 152. When the second end 155*b* is located at the first position, the electrical connection between the electrode 151 and the elastic conductor 152 is disconnected, so that the developing cartridge 100 is in the first state. When the second end 155*b* is located at the second position, the electrical connection between the electrode 151 and the elastic conductor 152 is connected, so that the developing cartridge 100 is in the second state.

Further, the first end 155*a* of the toggle torsion spring 155 is connected to a second electrical connector 156, and the second electrical connector 156 extends in the second direction to electrically connect the layer thickness regulating member 7 as an electrical connector. The layer thickness regulating member 7 is made of a conductive metal material, that is, the toggle torsion spring 155 is electrically connected to the electrode 151 through the second electrical connector 156 and the layer thickness regulating member 7. The driving gear 117 is provided with a contact portion 117*d* on one side of the first direction, and the contact portion 117*d* includes at least one concave portion that cannot contact the toggle torsion spring 155, and at least one convex portion that can contact the toggle torsion spring 155. In the state where the driving gear 117 receives the driving force and rotates, the concave and convex portions of the driving gear 117 rotate in sequence toward the second end 155*b* of the toggle torsion spring 155. In other words, the driving gear 117 can be switched between a non-contact state and a contact state with the toggle torsion spring 155. When the concave portion of the driving gear 117 is toward the second end 155*b* of the toggle torsion spring 155, the driving gear 117 is not in contact with the toggle torsion spring 155. When the convex portion of the driving gear 117 is toward the second end 155*b* of the toggle torsion spring 155, the driving gear 117 is in contact with the second end 155*b* of the toggle torsion spring 155 and applies an urging force to the second end 155*b*.

Figure 37:
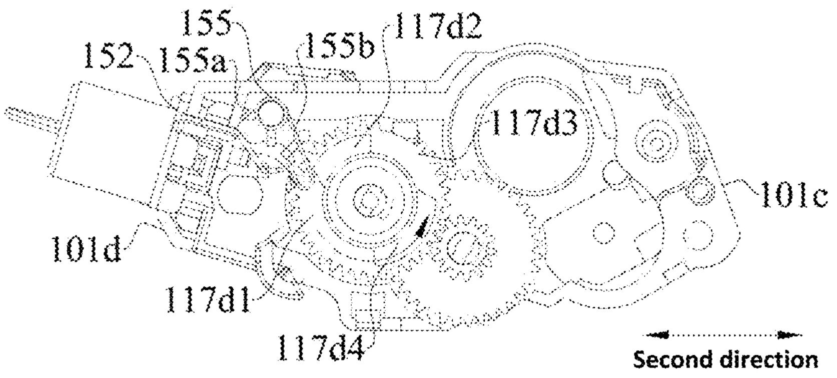
FIG. 37 is a side view of the first protective cover according to Embodiment 5 of the present application viewed from a second side in a first direction.
Figure 38:
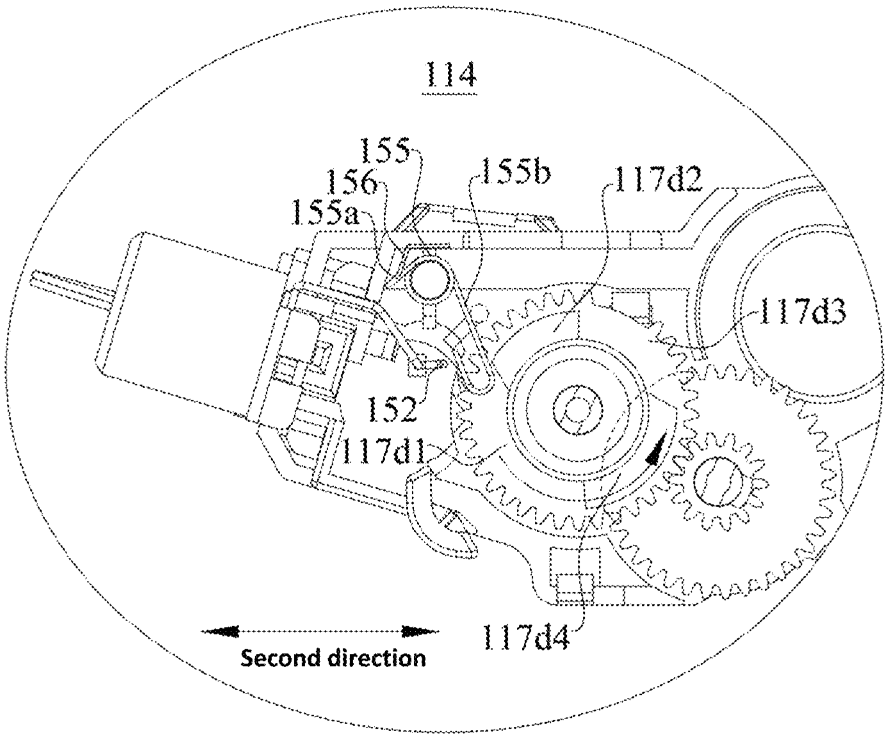
FIG. 38 is a partial side view of the first protective cover according to Embodiment 5 of the present application viewed from a second side in the first direction when the developing cartridge is in a first state.
Figure 39:
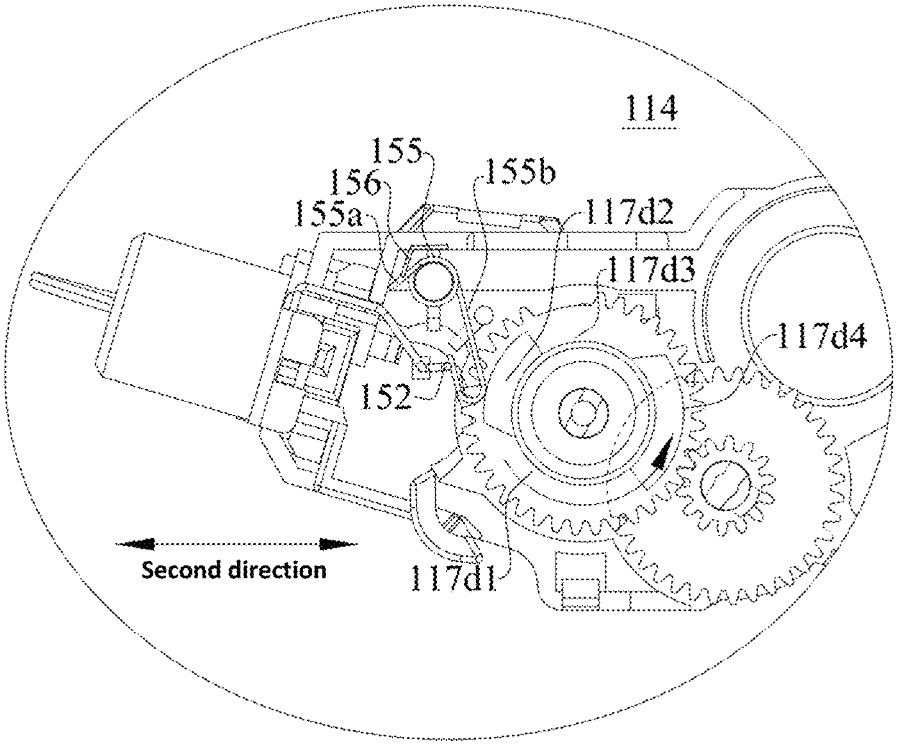
FIG. 39 is a partial side view of the first protective cover according to Embodiment 5 of the present application viewed from the second side in the first direction when the developing cartridge is in a second state.

Specifically, as shown in FIGS. 37-39, in this embodiment, the contact portion 117*d* includes a first concave portion 117*d*1, a first convex portion 117*d*2, a second concave portion 117*d*3 and a second convex portion 117*d*4. The tooth portion 117*a* of the driving gear 117 is transmission-connected to the gear portion 111*b* of the input gear 111 through the connecting gear 118. The driving gear 117 is rotatable about a driving gear axis A2 extending in a first direction. The first concave portion 117*d*1, the first convex portion 117*d*2, the second concave portion 117*d*3 and the second convex portion 117*d*4 are arranged in sequence along the rotation direction of the driving gear 117. In the radial direction of the driving gear 117, the distance between the first concave portion 117*d*1 and the second concave portion 117*d*3 and the driving gear axis A2 is smaller than the distance between the first convex portion 117*d*2 and the second convex portion 117*d*4 and the driving gear axis A2. When the driving gear 117 rotates toward the second end 155*b* of the toggle torsion spring 155 to the range of the first concave portion 117*d*1 or the second concave portion 117*d*3, the driving gear 117 does not contact the second end 155*b* of the toggle torsion spring 155. At this time, the second end 155*b* of the toggle torsion spring 155 is located in the first position under the action of its own elastic force, the electrical connection between the toggle torsion spring 155 and the elastic conductor 152 is disconnected, and the developing cartridge 100 is in the first state. When the driving gear 117 rotates toward the second end 155*b* of the toggle torsion spring 155 to the range of the first convex portion 117*d*2 or the second convex portion 117*d*4, the driving gear 117 contacts the second end 155*b* of the toggle torsion spring 155 and applies an urging force to the second end 155*b* of the toggle torsion spring 155. Under the action of the urging force, the second end 155*b* of the toggle torsion spring 155 overcomes its own elastic force and moves to the second position, so that the electrical connection between the toggle torsion spring 155 and the elastic conductor 152 is connected, and the developing cartridge 100 is in the second state. The developing cartridge 100 is switched between the first state and the second state through the rotation of the driving gear 117, and information of the developing cartridge 100 is transmitted to the imaging device through the switching frequency between the first state and the second state, thereby realizing the process of transmitting the information to the imaging device. Similarly, the above-mentioned arrangement of the concave and convex portions is not limited. It should be noted that the concave and convex portions on the developing cartridge 100 may be arranged differently, causing the developing cartridge 100 to presented at different switching frequencies, so that the developing cartridge 100 transmits different information to the imaging device, so as to help the imaging device to identify different developing cartridges.

Optionally, in other implementations of this embodiment, the first end 155*a* of the toggle torsion spring 155 may also be a movable end, and the first end 155*a* may receive the urging force of the driving gear 117 to move between a first position where it is not in contact with the second electrical connector 156 and a second position where it is in contact with the second electrical connector 156. The second end 155*b* of the toggle torsion spring 155 may be disposed as a fixed end, and the second end 155*b* may be fixedly electrically connected to the elastic conductor 152. Such an arrangement has the same technical effect, which will not be repeated here.

Figure 40:
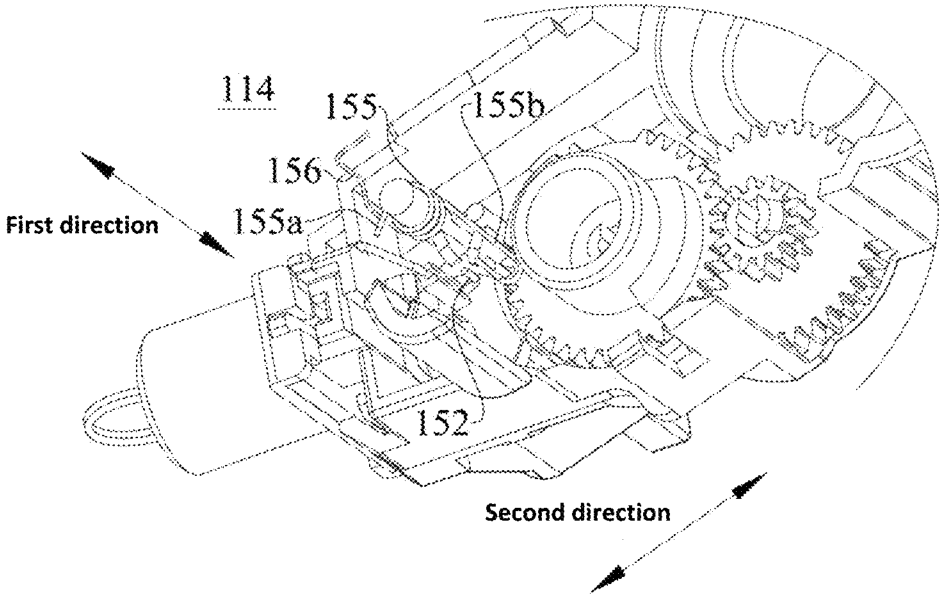
FIG. 40 is a partial side view of a three-dimensional structure of the first protective cover according to Embodiment 5 of the present application when the developing cartridge is in the first state.

As shown in FIG. 40, the second end 155*b* of the toggle torsion spring 155 may move in the second direction between a first position close to the driving gear 117 and a second position away from the driving gear 117, and one of an end of the elastic conductor 152 close to the second end 155*b* and the second end 155*b* of the toggle torsion spring 155 extends in the second direction to ensure that the second end 155*b* can be stably contacted.

Embodiment 6

Embodiment 6 of the present application will be described below. The difference between this embodiment and Embodiment 1 is that the conductive member is different from that of Embodiment 1.

Figure 41:
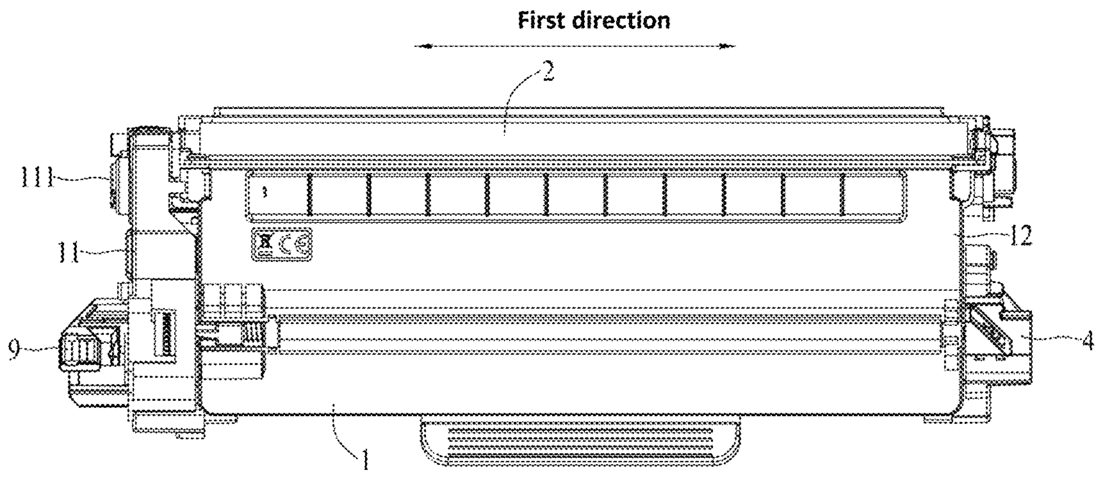
FIG. 41 is a schematic structural view of a developing cartridge according to Embodiment 6 of the present application from one angle.
Figure 42:
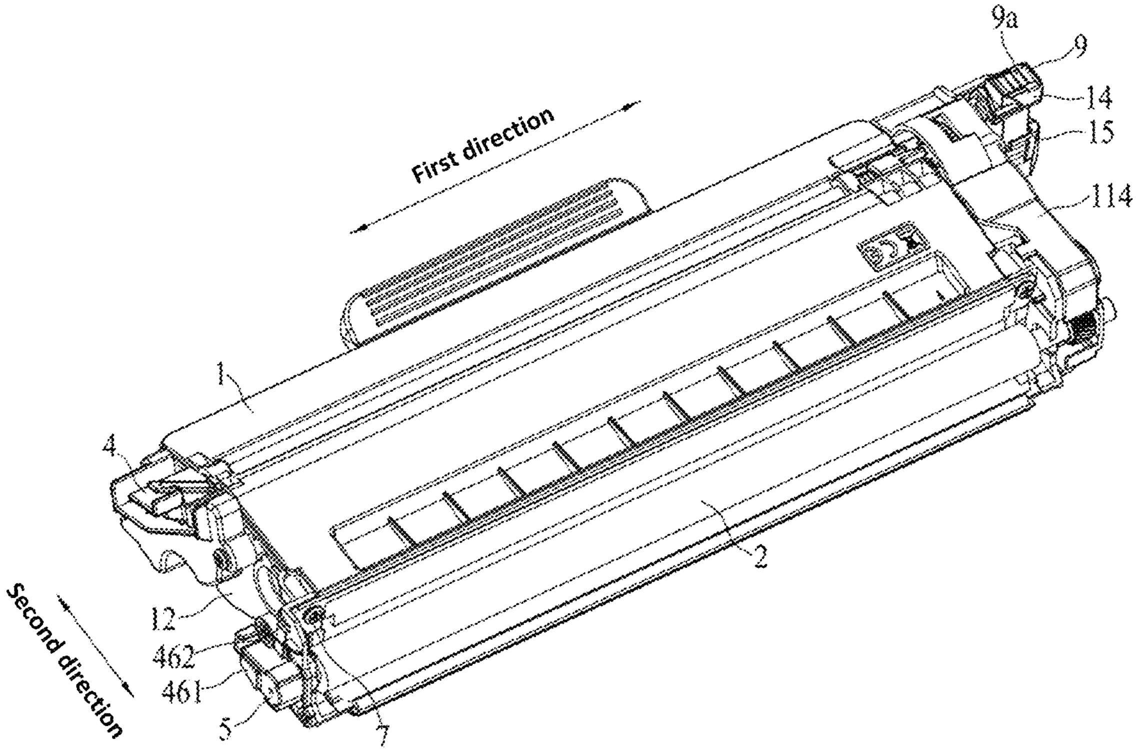
FIG. 42 is a schematic view of a three-dimensional structure of the developing cartridge according to Embodiment 6 of the present application from another angle.

As shown in FIGS. 41 and 42, the developing cartridge 100 includes a storage unit 9 positioned at the first side 11 and a chip holder 14 for supporting a storage unit. The storage unit 9 may be movably mounted on the protective cover 114 together with the chip holder 14. In this embodiment, a chip cover 15 is further provided on the outer side of the protective cover 114. The chip holder 14 is movable between the chip cover 15 and the protective cover 114. The storage unit 9 is used to store relevant information of the developing cartridge 100 and has an electrical contact portion 9*a* exposed outside the chip holder 14.

Figure 43:
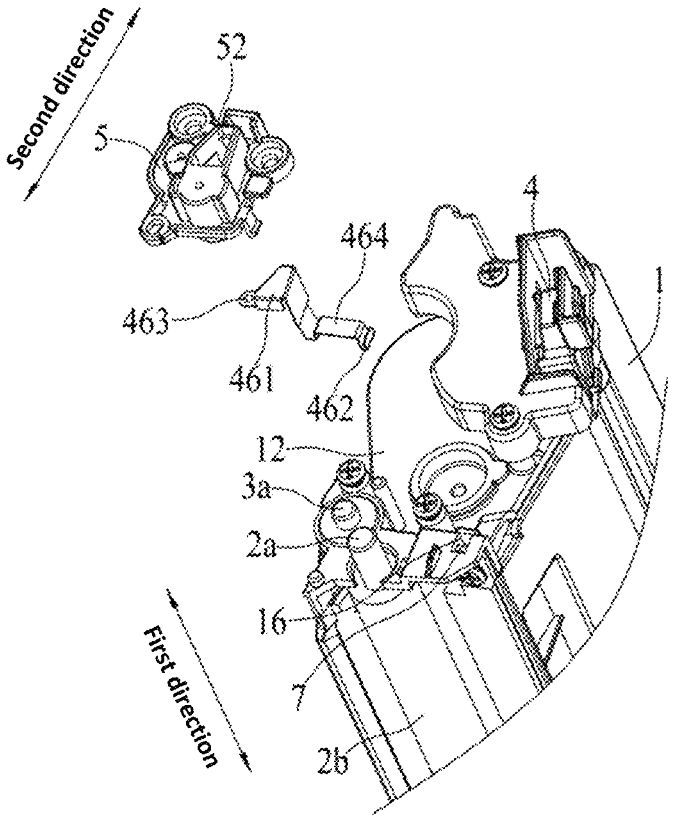
FIG. 43 is a partial exploded schematic view of the second side of the developing cartridge according to Embodiment 6 of the present application.
Figure 44:
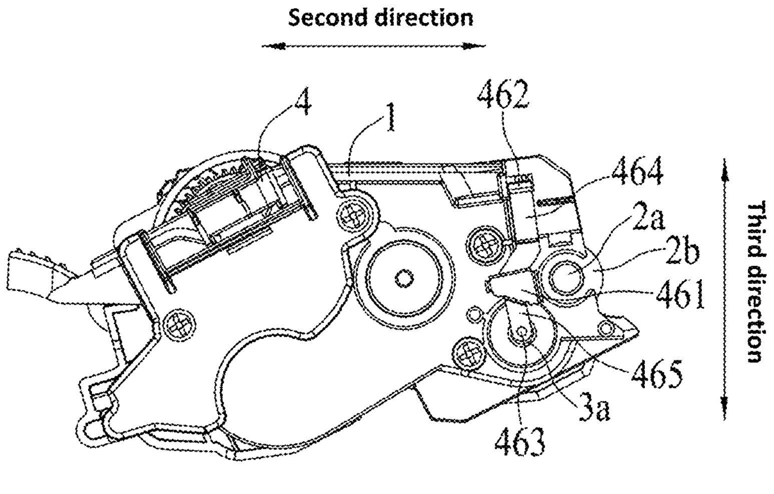
FIG. 44 is a schematic view of a front structure of the second side of the developing cartridge according to Embodiment 6 of the present application.
Figure 45:
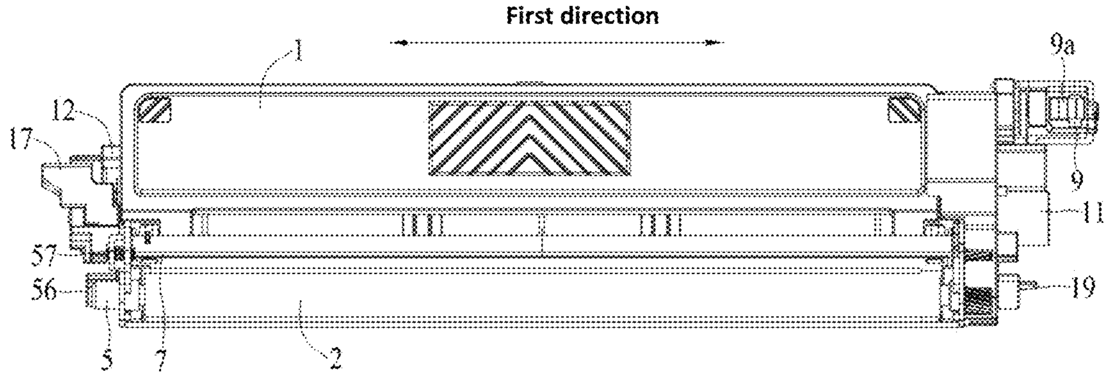
FIG. 45 is a schematic structural view of a developing cartridge according to Embodiment 7 of the present application from one angle.
Figure 46:
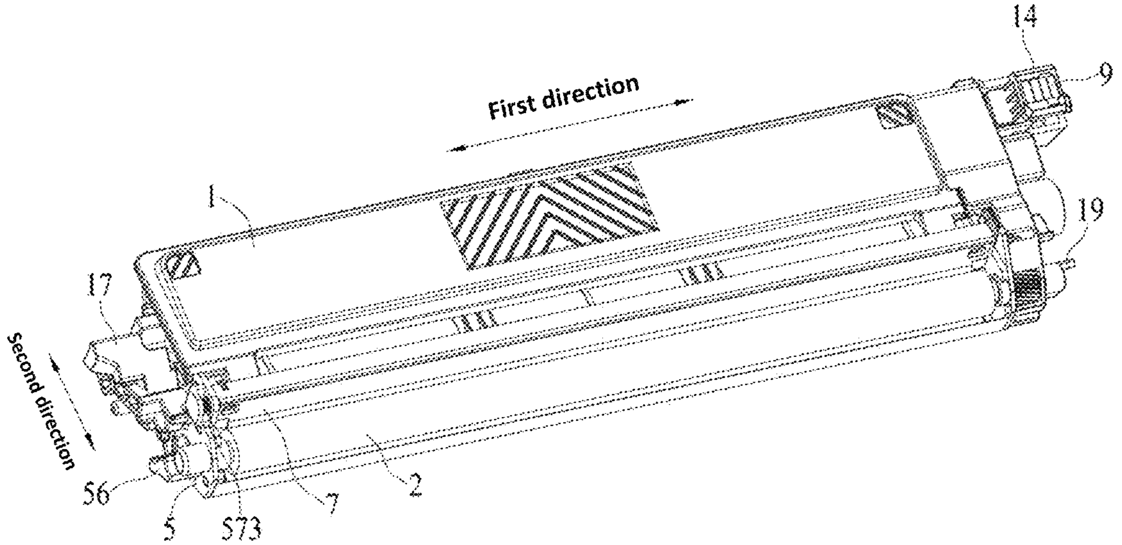
FIG. 46 is a schematic view of a three-dimensional structure of the developing cartridge according to Embodiment 7 of the present application from another angle.
Figure 47:
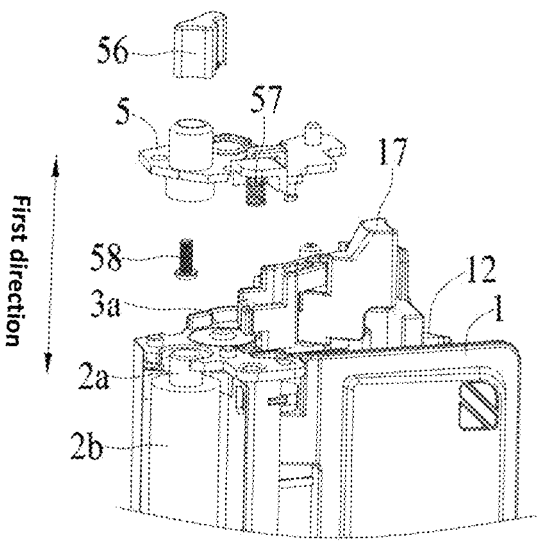
FIG. 47 is a partial exploded schematic view of the second side of the developing cartridge according to Embodiment 7 of the present application.
Figure 48:
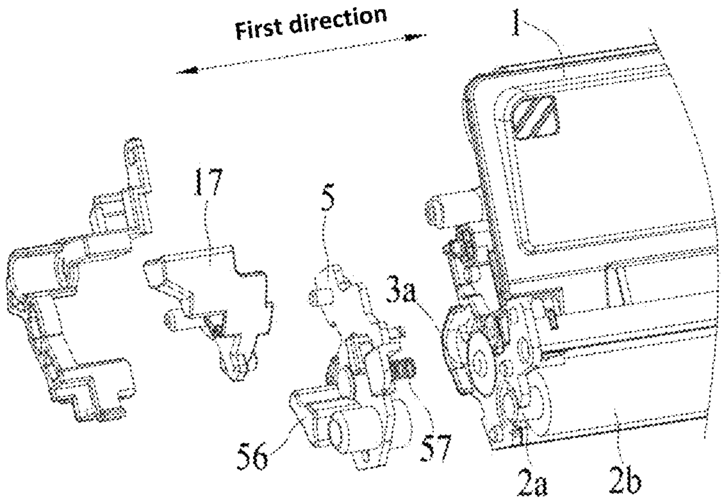
FIG. 48 is an exploded schematic view of the second side of the developing cartridge according to Embodiment 7 of the present application.

As shown in FIGS. 43 and 44, the developing cartridge 100 further includes a conductive member. The conductive member is positioned at the second side 12 of the casing 1. The conductive member 46 is used to contact the power supply component of the image forming device to achieve electrical connection and receive the power output by the power supply component. The conductive member 46 includes a first contact portion 461, a second contact portion 462, a third contact portion 463, a first connection portion 464 connected between the first contact portion 461 and the second contact portion 462, and a second connection portion 465 connected between the second contact portion 462 and the third contact portion 463, wherein the first contact portion 461 is used to contact the power supply component of the image forming device to achieve electrical connection, the second contact portion 462 contacts the layer thickness regulating member 7 and transmits power to the layer thickness regulating member 7, and the third contact portion 463 contacts the supply roller 3 and transmits power to the supply roller 3. Specifically, the first contact portion 461 is constructed as a flat plate structure, and the bracket 5 is provided with a fixing hole 52 that penetrates the bracket in the first direction. The first contact portion 461 is disposed in the fixing hole 52 and is at least partially exposed outside the fixing hole 52, the second contact portion 462 is constructed as a "U"-shaped spring piece, and the casing 1 is provided with a mounting hole 16 that is recessed inward from the second side 12. The second contact portion 462 passes through the mounting hole 16 and abuts the blade holder of the layer thickness regulating member 7, and the third contact portion 463 is constructed as a contact protrusion. The contact protrusion abuts the supply roller shaft 3*a*. In the first direction, the first contact portion 461, the second contact portion 462 and the third contact portion 463 are arranged in sequence, that is, the first connection portion 464 is disposed to be formed by bending and extending between the first contact portion 461 and the second contact portion 462, and the second connection portion 465 is disposed to be formed by bending and extending between the second contact portion 462 and the third contact portion 463.

Embodiment 7

Embodiment 7 of the present application will be described below. The difference between this embodiment and Embodiment 3 is that the conductive structure is different from that of Embodiment 3.

As shown in FIGS. 45 to 48, the developing cartridge 100 includes a storage unit 9 positioned at the first side 11 and a chip holder 14 for supporting a storage unit 9. The storage unit 9 may be movably mounted on the protective cover 114 together with the chip holder 14. In this embodiment, the chip holder 14 is movable between the chip cover 15 and the protective cover 114. The storage unit 9 is used to store relevant information of the developing cartridge 100 and has an electrical contact portion 9*a* exposed outside the chip holder 14. It can be understood that the chip holder 14 may be fixedly mounted on the protective cover, or integrally molded with the protective cover 114, and the electrical contact portion 9*a* is closer to a rear end in the second direction relative to a front end where the developing roller 2 is located.

The developing cartridge 100 further includes a first separator 19 positioned at the first side 11 and a second separator 17 positioned at the second side 12, wherein the second separator 17 is used to receive the urging force from the image forming device and may move relative to the casing 1, and the second separator 17 is near an end of the casing 1 away from the developing roller 2 in the second direction intersecting the first direction; and the first separator 19 is integrally disposed with the casing 1 or fixedly mounted on the casing 1, and is formed by extending from the first side 11 of the casing 1 in the first direction. The first separator 19 is used to receive the urging force from the drum assembly, and is near the other end of the casing 1 close to the developing roller 2 in the second direction.

Figure 49:
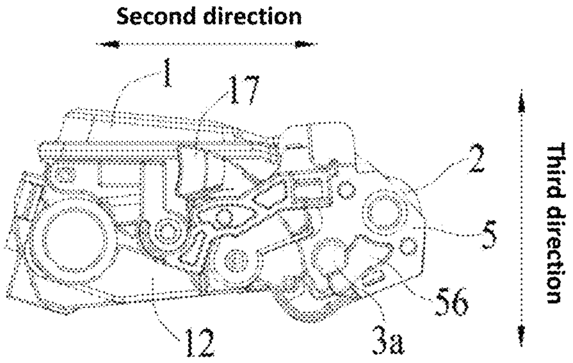
FIG. 49 is a schematic view of a front structure of the second side of the developing cartridge according to Embodiment 7 of the present application.
Figure 50:
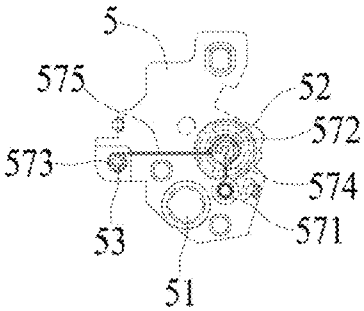
FIG. 50 is a schematic structural view of a second conductive member and a bracket of the developing cartridge according to Embodiment 7 of the present application.

As shown in FIGS. 49 and 50, the developing cartridge 100 further includes a conductive assembly. The conductive assembly is at least partially supported on the bracket 5. The conductive assembly includes a first conductive member 56 and a second conductive member 57. The first conductive member 56 is mounted on the bracket 5 and is at least partially exposed outside the casing 1. The exposed portion of the first conductive member 56 is used to contact the power supply component of the image forming device to achieve electrical connection and receive the power output by the power supply component. The first conductive member 56 is configured as a conductive resin. In this embodiment, the first conductive member 56 is fixedly mounted on the bracket 5 by a screw 58. In other optional embodiments, it may also be fixed to the bracket 5 by means of a snap connection or the like.

The second conductive member 57 is mounted on the bracket 5, and the second conductive member 57 is electrically connected to the first conductive member 56. The second conductive member 57 is configured as a conductive steel wire. The bracket 5 is provided with a mounting groove, and the second conductive member 57 is fixed in the mounting groove. The second conductive member 57 includes a first contact part 571, a second contact part 572 and a third contact part 573. The first contact part 571 is connected to the first conductive member 56, the second contact part 572 is connected to the first contact part 571 through a first connection portion 574, and the third contact part 573 is connected to the second contact part 572 through a second connection portion 575, thereby transmitting power to the layer thickness adjustment member 7 and the supply roller shaft 3*a*.

Embodiment 8

Embodiment 8 of the present application will be described below. The difference between this embodiment and Embodiment 1 is that the conductive member is different from that of Embodiment 1.

Figure 51:
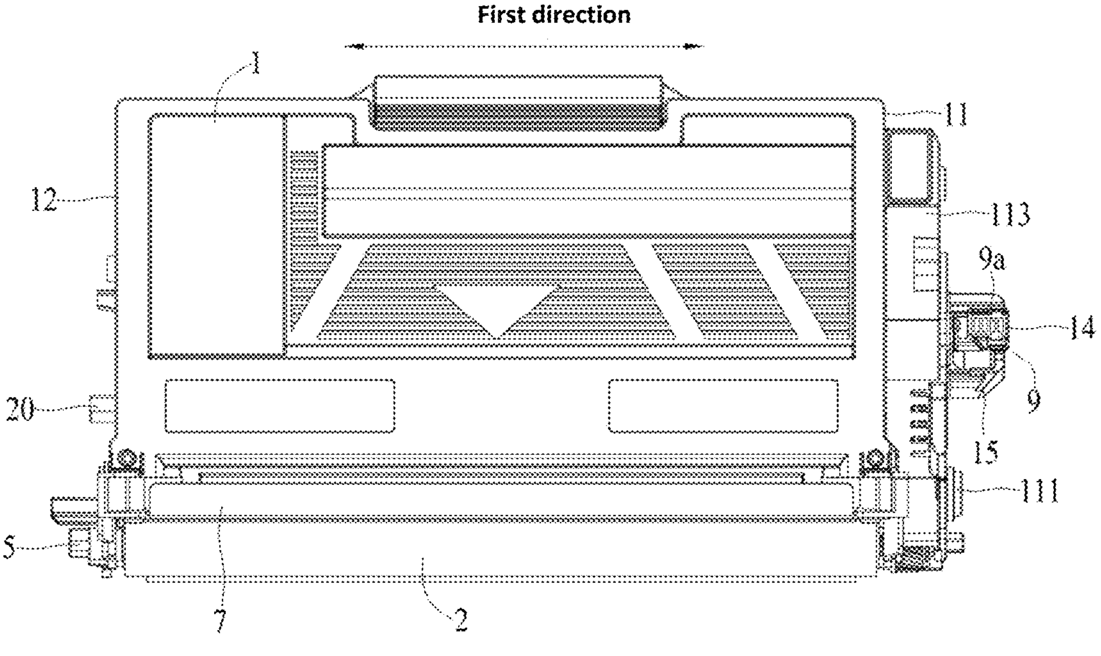
FIG. 51 is a schematic structural view of a developing cartridge according to Embodiment 8 of the present application from one angle.

As shown in FIG. 51, the developing cartridge 100 includes a storage unit 9 positioned at the first side 11 and a chip holder 14 for supporting a storage unit. The storage unit 9 may be movably mounted on the protective cover 114 together with the chip holder 14. In this embodiment, a chip cover 15 is further provided on the outer side of the protective cover 114. The chip holder 14 is movable between the chip cover 15 and the protective cover 114. The storage unit 9 is used to store relevant information of the developing cartridge 100 and has an electrical contact portion 9*a* exposed outside the chip holder 14. It can be understood that the chip holder 14 may be fixedly mounted on the protective cover, or integrally molded with the protective cover 114, and the electrical contact portion 9*a* is closer to a rear end in the second direction relative to a front end where the developing roller 2 is located.

Figure 52:
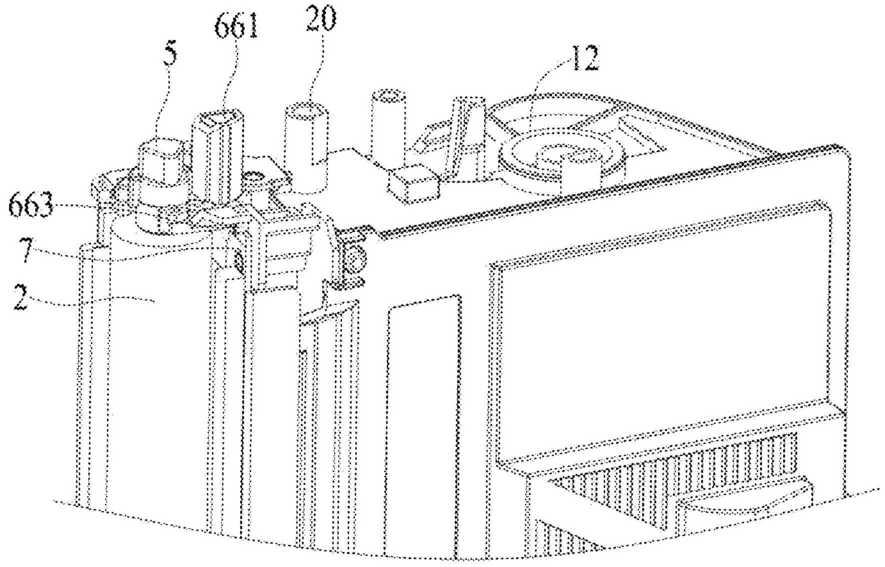
FIG. 52 is a schematic view of a three-dimensional structure of the developing cartridge according to Embodiment 8 of the present application from another angle.
Figure 53:
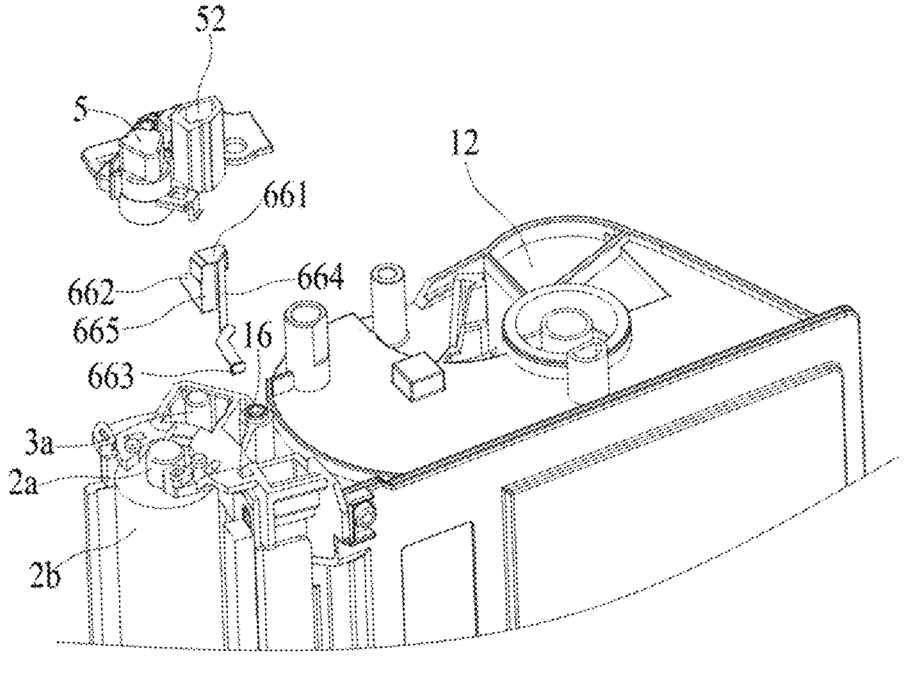
FIG. 53 is a partial exploded schematic view of a second side of the developing cartridge according to Embodiment 8 of the present application.
Figure 54:
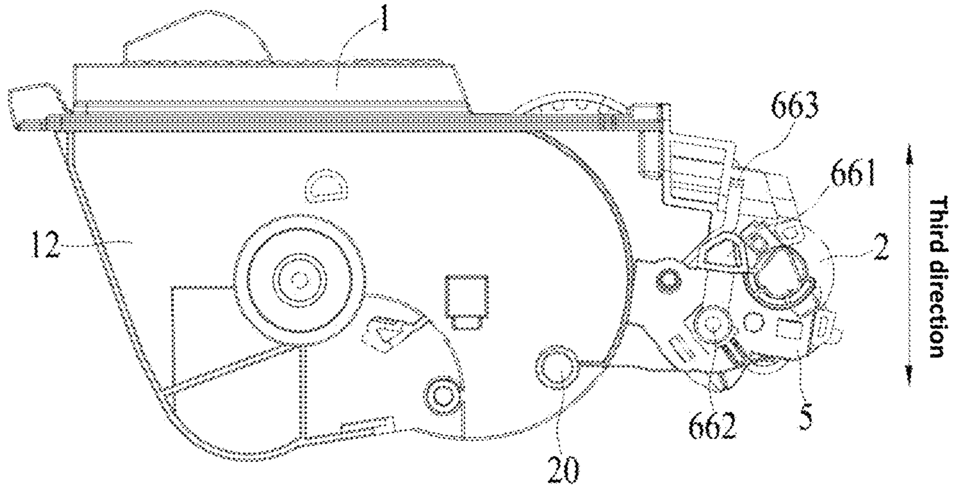
FIG. 54 is a schematic view of a front structure of the second side of the developing cartridge according to Embodiment 8 of the present application.

As shown in FIGS. 52 to 54, the developing cartridge 100 further includes a conductive member. The conductive member is positioned at the second side 12 of the casing 1. The conductive member 66 is used to contact the power supply component of the image forming device to achieve electrical connection and receive the power output by the power supply component. The conductive member 66 includes a first contact portion 661, a second contact portion 663, a third contact portion 662, a first connection portion 664 connected between the first contact portion 661 and the second contact portion 663, and a second connection portion 665 connected between the second contact portion 663 and the third contact portion 662, wherein the first contact portion 661 is used to contact the power supply component of the image forming device to achieve electrical connection, the second contact portion 663 contacts the layer thickness regulating member 7 and transmits power to the layer thickness regulating member 7, and the third contact portion 662 contacts the supply roller shaft 3*a* and transmits power to the supply roller 3. Specifically, the first contact portion 661 is constructed as a flat plate structure, and the bracket 5 is provided with a fixing hole 52 that penetrates the bracket in the first direction. The first contact portion 661 is disposed in the fixing hole 52 and is at least partially exposed outside the fixing hole 52, the second contact portion 663 is constructed as a "U"-shaped spring piece, and the casing 1 is provided with a mounting hole 16 that is recessed inward from the second side 12. The second contact portion 663 passes through the mounting hole and abuts the blade holder of the layer thickness regulating member 7, and the third contact portion 662 is constructed as a contact protrusion. The contact protrusion abuts the supply roller shaft 3*a*. In the first direction, the first contact portion 661, the second contact portion 663 and the third contact portion 662 are arranged in sequence, that is, the first connection portion 664 is disposed to be formed by bending and extending between the first contact portion 661 and the second contact portion 663, and the second connection portion 665 is disposed to be formed by bending and extending between the second contact portion 663 and the third contact portion 662.

The second side 12 is further provided with an urging protrusion 20. The urging protrusion 20 is used to receive a force outside the developing cartridge 100 so that the developing roller 2 in the developing cartridge 100 is close to a photosensitive drum in a drum cartridge, and the urging protrusion 20 is behind the conductive member in the second direction.

What is claimed is:

1. A developing cartridge, comprising:
- a developing roller rotatable about a rotational axis extending in a first direction;
- a casing configured to accommodate developer therein;
- an input gear rotatable about a first axis extending in the first direction, the input gear being positioned at one side of the casing in the first direction;
- an electrode with an electrical contact surface;
- wherein the developing roller comprises a developing roller shaft extending in the first direction, a covering layer covering a surface of the developing roller shaft, and an elastic layer rotating synchronously with the developing roller shaft;
- wherein the electrical contact surface is electrically connected to a component of the developing cartridge, and the covering layer is made of a non-metallic material or an electrically insulating material.

2. The developing cartridge according to claim 1, wherein the electrical contact surface is positioned at another side of the casing in the first direction.

3. The developing cartridge according to claim 1, wherein the component contacts the elastic layer of the developing roller.

4. The developing cartridge according to claim 1, wherein an electrical resistance between the electrical contact surface and the developing roller shaft is greater than an electrical resistance between the electrical contact surface and the elastic layer.

5. The developing cartridge according to claim 1, wherein at least a part of the covering layer is between the elastic layer and the developing roller shaft.

6. The developing cartridge according to claim 1, further comprising a supply roller, wherein the supply roller is rotatable about a second axis extending in the first direction, and the component is the supply roller.

7. The developing cartridge according to claim 1, further comprising a bracket positioned at another side of the casing in the first direction, wherein the electrode is supported on the bracket, one end of the developing roller shaft is supported on the bracket.

8. The developing cartridge according to claim 1, further comprising a bracket positioned at another side of the casing in the first direction, wherein the bracket comprises a developing roller bearing thereon, and the covering layer is supported by the developing roller bearing.

9. The developing cartridge according to claim 1, further comprising a storage unit, at the one side of the casing, and the storage unit and the covering layer are separated in a second direction different from the first direction.

10. The developing cartridge according to claim 1, wherein a through hole is provided at an end of the developing roller shaft.

11. The developing cartridge according to claim 1, further comprising an urging protrusion and a storage unit, wherein the storage unit is at the one side of the casing, and the urging protrusion is positioned between the covering layer and the storage unit in a second direction intersecting the first direction.

12. The developing cartridge according to claim 1, further comprising a layer thickness regulating member configured to regulate a thickness of a developer layer carried on a surface of the developing roller, the component is the layer thickness regulating member.

13. The developing cartridge according to claim 1, further comprising an electrical connector at the one side of the casing in the first direction; wherein the electrical connector is electrically connected to the component of the developing cartridge, and the electrical connector is movable between a first position at which the electrical connector is electrically connected to a grounded metal frame outside the developing cartridge, and a second position at which the electrical connector is electrically disconnected from the grounded metal frame.

14. The developing cartridge according to claim 13, further comprising a protrusion, wherein the protrusion is movable according to rotation of the input gear, and the electrical connector moves between the first position and the second position according to movement of the protrusion.

15. A developing cartridge, comprising:

a developing roller rotatable about a rotational axis extending in a first direction;

a casing configured to accommodate developer therein;

an input gear rotatable about a first axis extending in the first direction, the input gear being positioned at one side of the casing in the first direction;

an electrode with an electrical contact surface, and the electrical contact surface being positioned at another side of the casing in the first direction;

the electrical contact surface is electrically connected to a component of the developing cartridge, the developing roller comprises a developing roller shaft extending in the first direction and an elastic layer rotating synchronously with the developing roller shaft, and an electrical resistance between the electrical contact surface and the developing roller shaft is greater than or equal to 1 MΩ.

16. The developing cartridge according to claim 15, wherein the electrical resistance is greater than or equal to 20 MΩ.

17. The developing cartridge according to claim 15, wherein the developing roller further comprises a covering layer covering a surface of the developing roller shaft, and the electrical resistance is greater than an electrical resistance between the electrical contact surface and the elastic layer.

18. The developing cartridge according to claim 15, further comprising a bracket at another side of the casing, wherein the bracket comprises a developing roller bearing thereon, a surface of the developing roller shaft is covered with a covering layer, the covering layer is made of an electrically insulating material, and the covering layer is supported by the developing roller bearing.

19. The developing cartridge according to claim 15, further comprising a supply roller, wherein the supply roller comprises a supply roller shaft, the supply roller shaft is rotatable about a second axis extending in the first direction, and an electrical resistance between the electrical contact surface and the supply roller shaft is greater than 10 MΩ.

20. The developing cartridge according to claim 15, wherein a through hole is provided at an end of the developing roller shaft.

* * * * *